(12) United States Patent
Kim

(10) Patent No.: US 11,435,196 B2
(45) Date of Patent: Sep. 6, 2022

(54) METHOD AND APPARATUS FOR MANAGING LOST PROPERTY IN SHARED AUTONOMOUS VEHICLE

(71) Applicant: LG ELECTRONICS INC., Seoul (KR)

(72) Inventor: Soryoung Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 206 days.

(21) Appl. No.: 16/632,852

(22) PCT Filed: Jul. 19, 2019

(86) PCT No.: PCT/KR2019/008930
§ 371 (c)(1),
(2) Date: Jan. 21, 2020

(87) PCT Pub. No.: WO2021/015303
PCT Pub. Date: Jan. 28, 2021

(65) Prior Publication Data
US 2021/0404816 A1    Dec. 30, 2021

(51) Int. Cl.
*G01C 21/34* (2006.01)
*B60W 60/00* (2020.01)
*G06V 20/59* (2022.01)
(Continued)

(52) U.S. Cl.
CPC ........ *G01C 21/3407* (2013.01); *B60W 40/08* (2013.01); *B60W 50/14* (2013.01);
(Continued)

(58) Field of Classification Search
CPC . G01C 21/3407; B60W 60/001; B60W 40/08; B60W 50/14; B60W 2556/45;
(Continued)

(56) References Cited

U.S. PATENT DOCUMENTS 10,127,795 B1 * 11/2018 Hwang ................. H04W 4/023
10,303,961 B1 *  5/2019 Stoffel ..................... B60Q 3/76
(Continued)

FOREIGN PATENT DOCUMENTS

JP    2013-109685 A    6/2013
KR   10-2012-0003755 A   1/2012
(Continued)

*Primary Examiner* — Dale W Hilgendorf
*Assistant Examiner* — Hana Lee
(74) *Attorney, Agent, or Firm* — Birch, Stewart, Kolasch & Birch, LLP

(57) ABSTRACT

Disclosed herein is a method and apparatus for managing lost property in a shared autonomous vehicle, which determine a likely lost property spot based on a location and time a passenger is highly likely to lose their property, by monitoring the passenger's movements in the vehicle and classifying the passenger's behavior as a behavior pattern that makes the passenger prone to losing their property. Accordingly, the passenger may send a lost property retrieval request, and the passenger may be given guidance on how to retrieve the lost property, thereby allowing for efficient management of lost property in a shared autonomous vehicle. One or more among an autonomous vehicle, user terminal, and server according to the present invention may be associated with an artificial intelligence module, a drone (or unmanned aerial vehicle (UAV)) robot, an augmented reality (AR) device, a virtual reality (VR) device, and a 5G service-related device.

20 Claims, 28 Drawing Sheets

(51) Int. Cl.
*G06V 40/20* (2022.01)
*B60W 40/08* (2012.01)
*B60W 50/14* (2020.01)
*G08B 21/24* (2006.01)

(52) U.S. Cl.
CPC .......... *B60W 60/001* (2020.02); *G06V 20/59* (2022.01); *G06V 40/20* (2022.01); *G08B 21/24* (2013.01); *B60W 2040/0881* (2013.01); *B60W 2050/143* (2013.01); *B60W 2050/146* (2013.01); *B60W 2540/223* (2020.02); *B60W 2556/45* (2020.02)

(58) Field of Classification Search
CPC ... B60W 2540/223; B60W 2040/0881; B60W 2050/143; B60W 2050/146; G06K 9/00335; G06K 9/00832; G08B 21/24
See application file for complete search history.

(56) References Cited

U.S. PATENT DOCUMENTS

| | | | |
|---|---|---|---|
| 2014/0088860 | A1* | 3/2014 | Poornachandran .. G01C 21/206 701/410 |
| 2014/0173439 | A1* | 6/2014 | Gutierrez ................ H04L 43/10 715/738 |
| 2016/0242217 | A1 | 8/2016 | Yan |
| 2017/0098364 | A1 | 4/2017 | Jaegal |
| 2019/0197325 | A1* | 6/2019 | Reiley .................... G08B 21/24 |
| 2020/0202149 | A1* | 6/2020 | Zhang ................ G01C 21/3438 |

FOREIGN PATENT DOCUMENTS

| | | |
|---|---|---|
| KR | 10-1639324 B1 | 7/2016 |
| KR | 10-2017-0040015 A | 4/2017 |

* cited by examiner

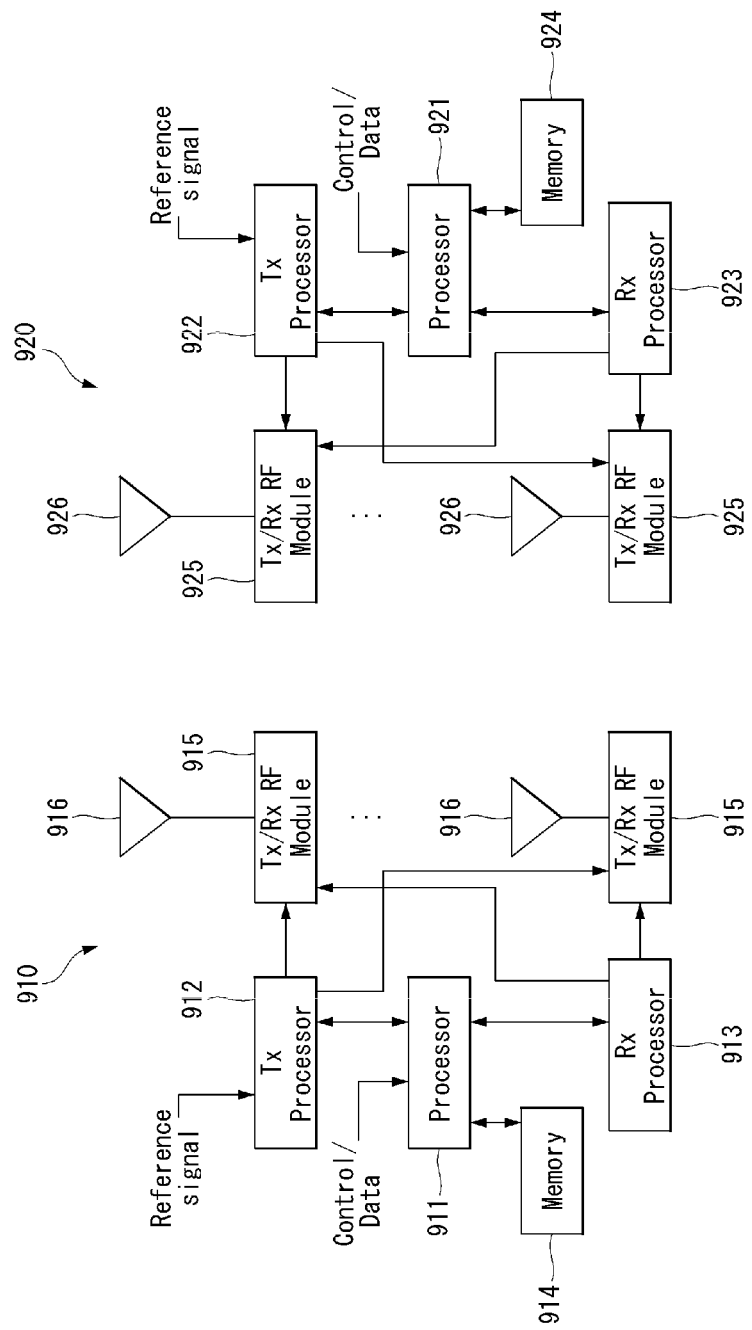
[Figure 1]

[Figure 2]
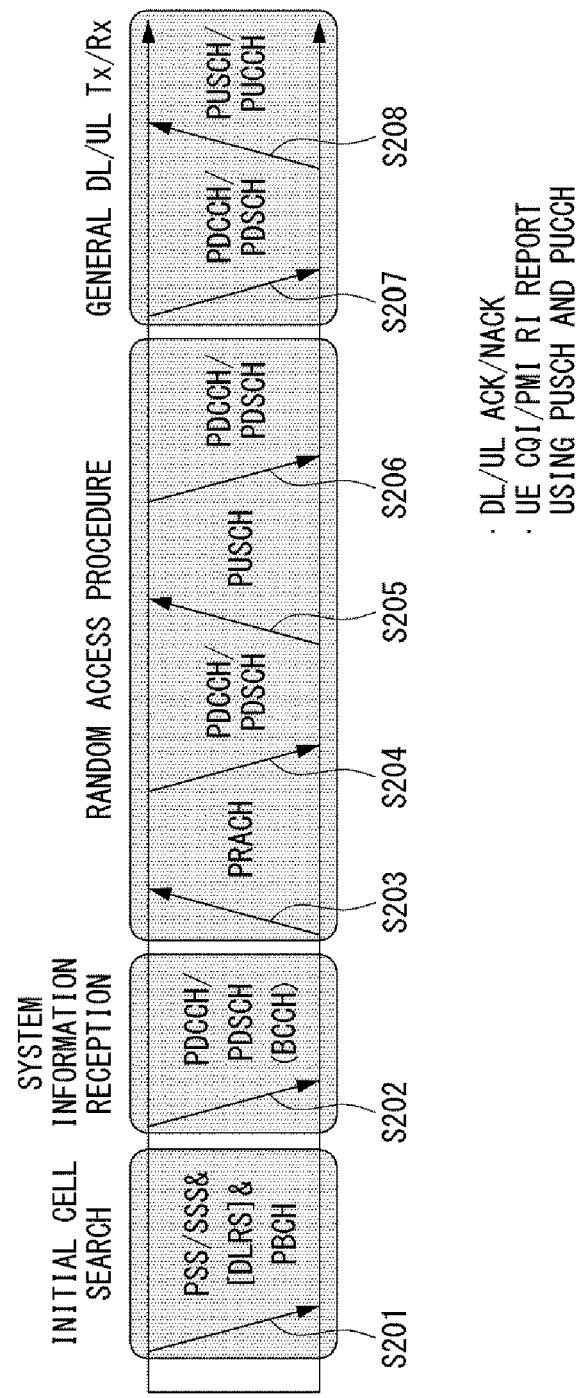

[Figure 3]
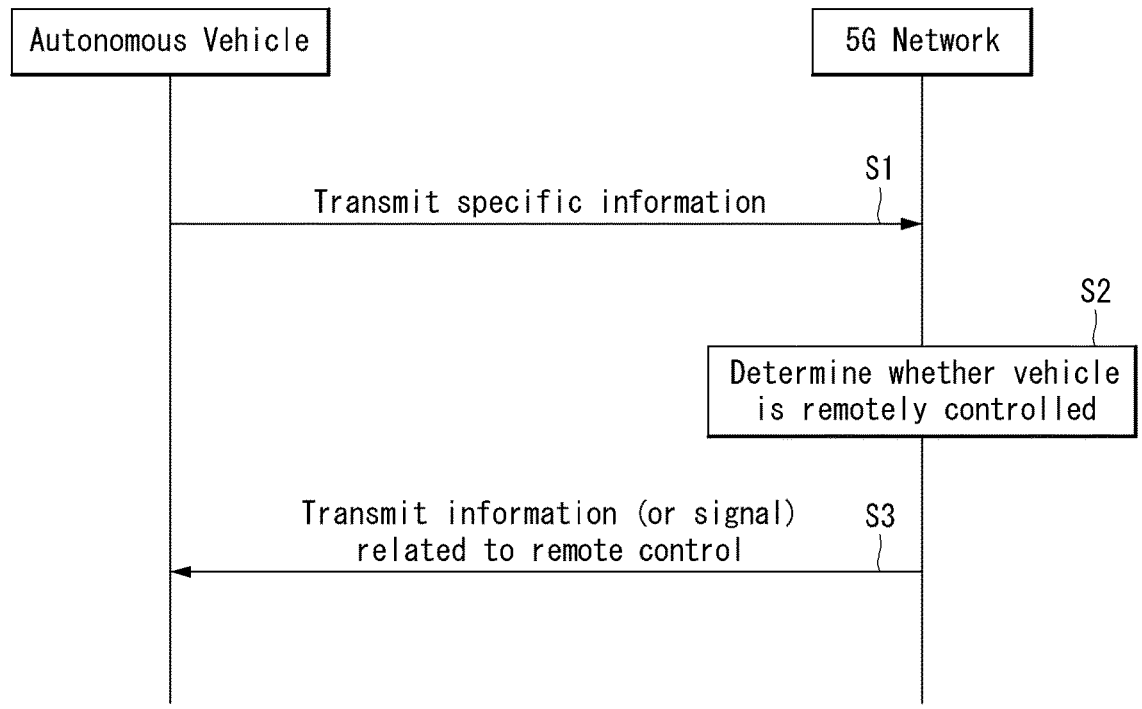
[Figure 4]
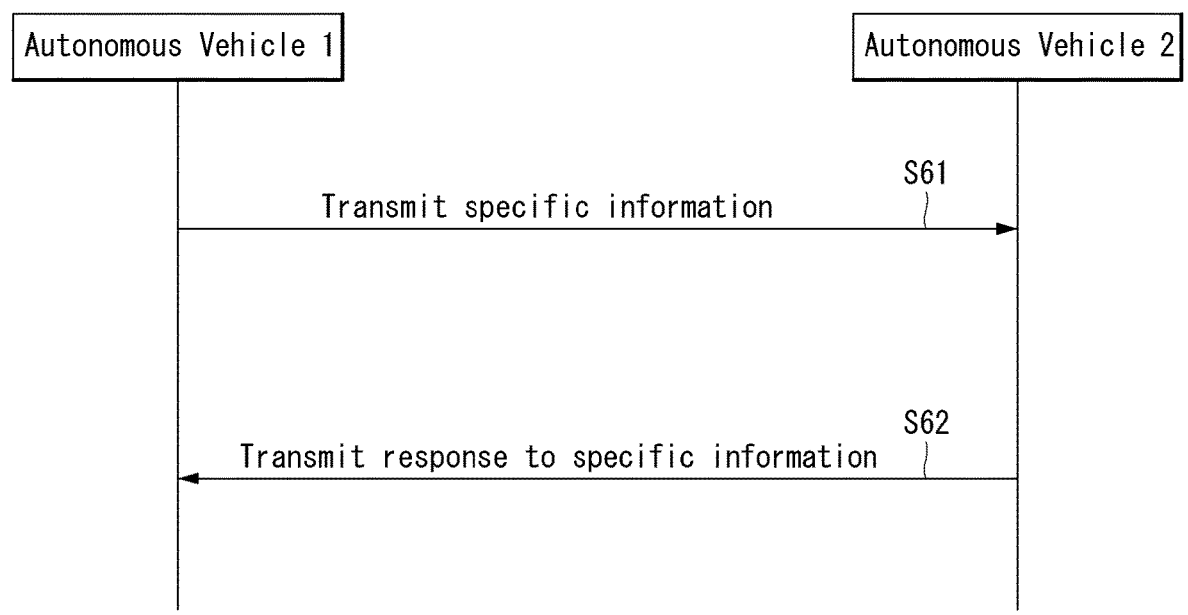

[Figure 5]
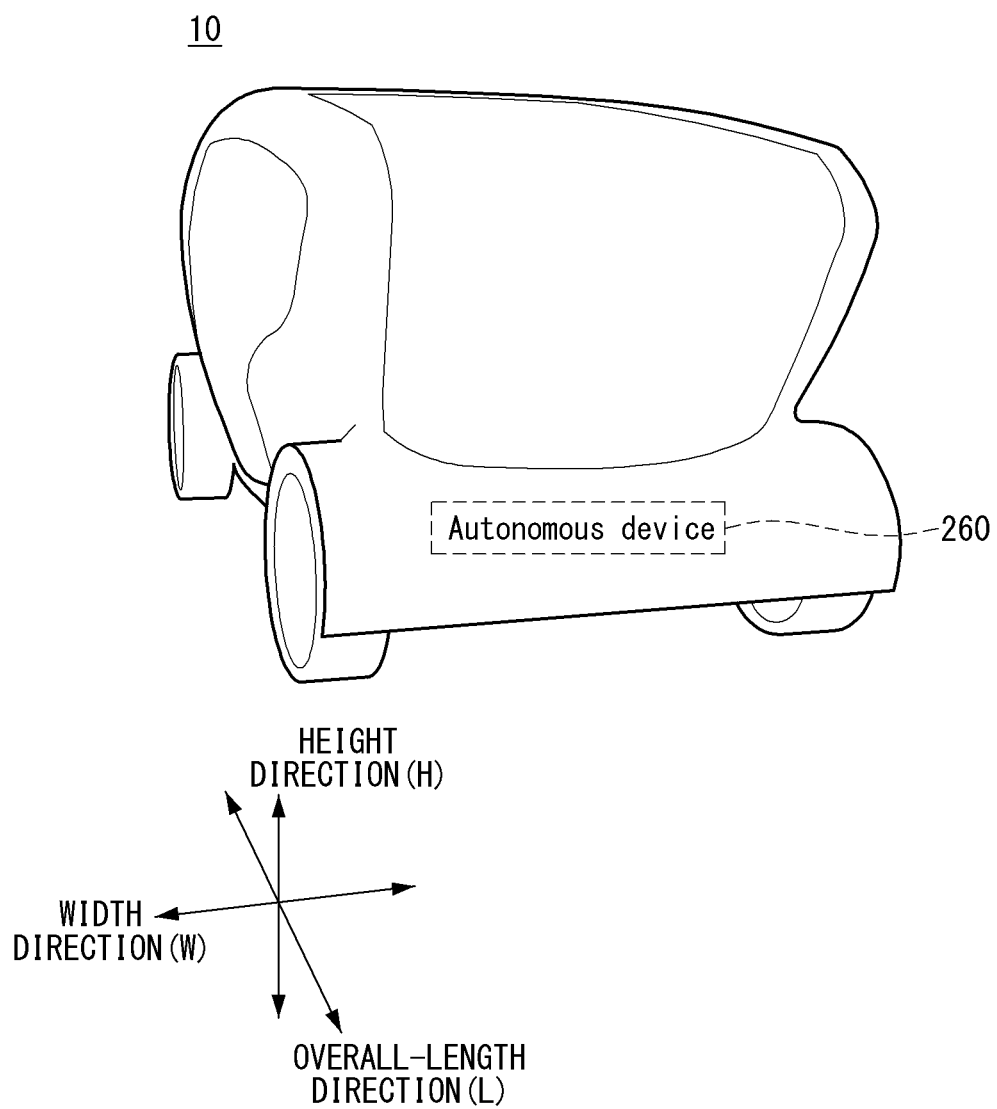

[Figure 6]
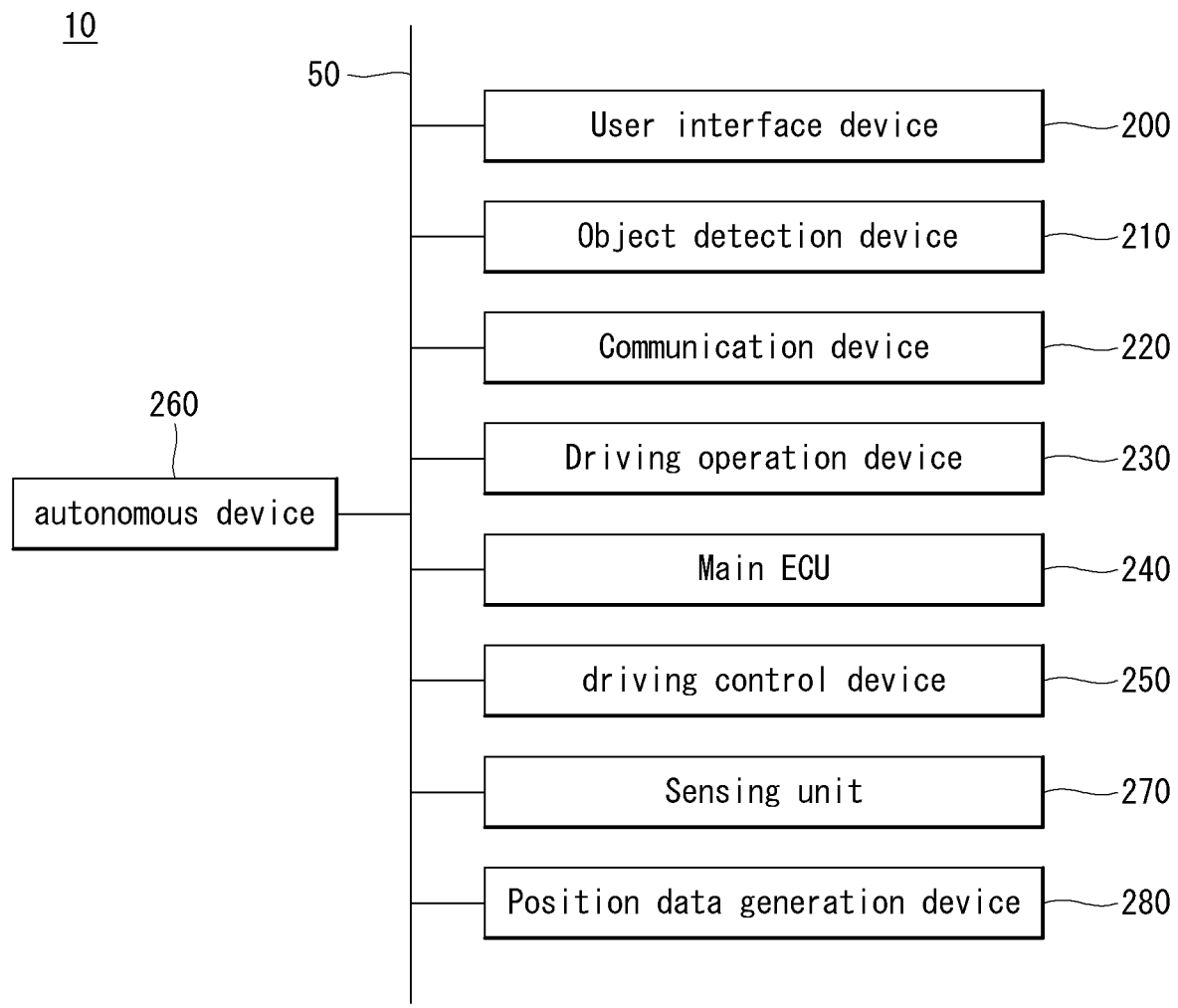

[Figure 7]
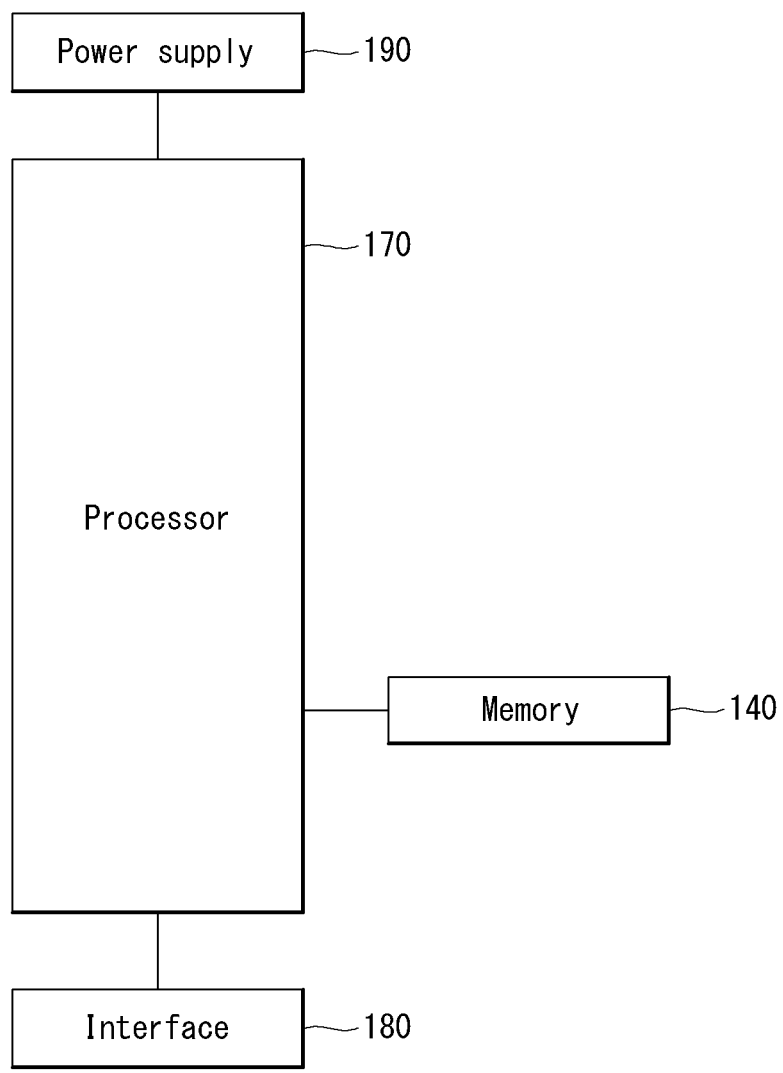

【Figure 8】
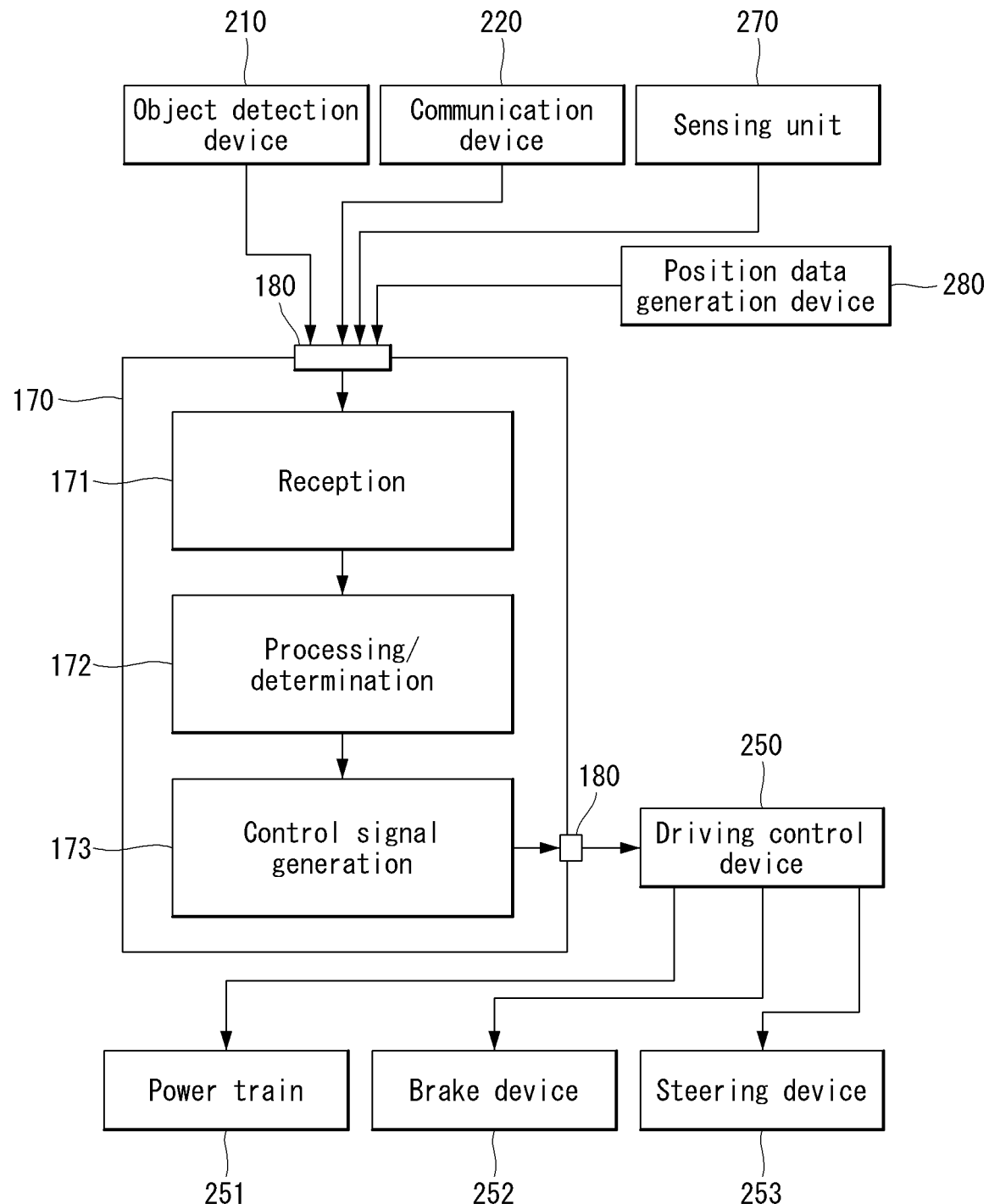

[Figure 9]
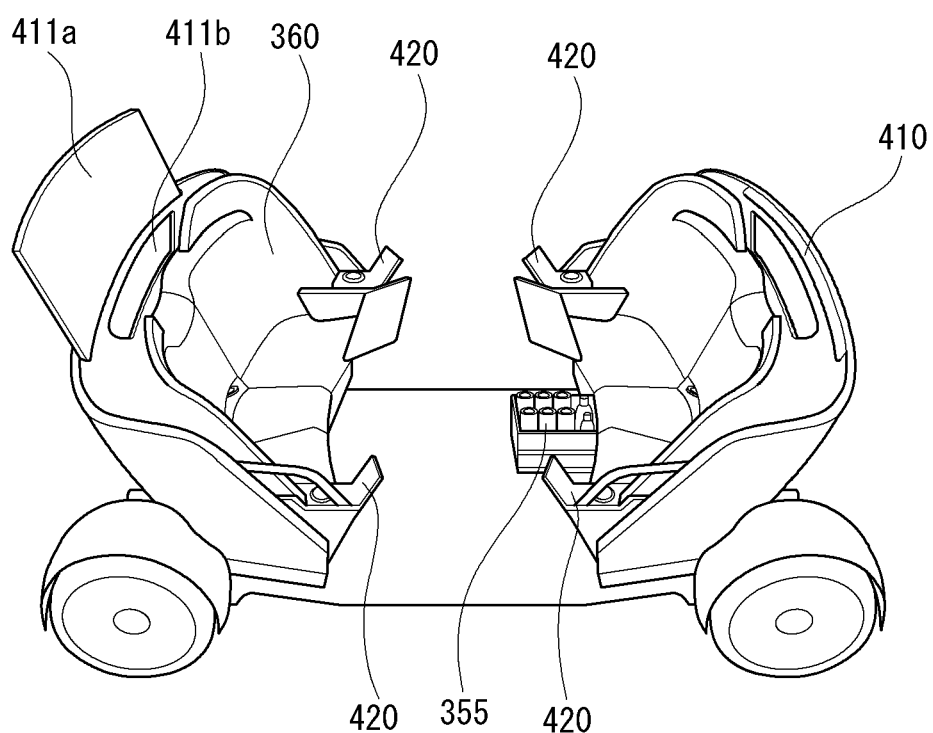

[Figure 10]
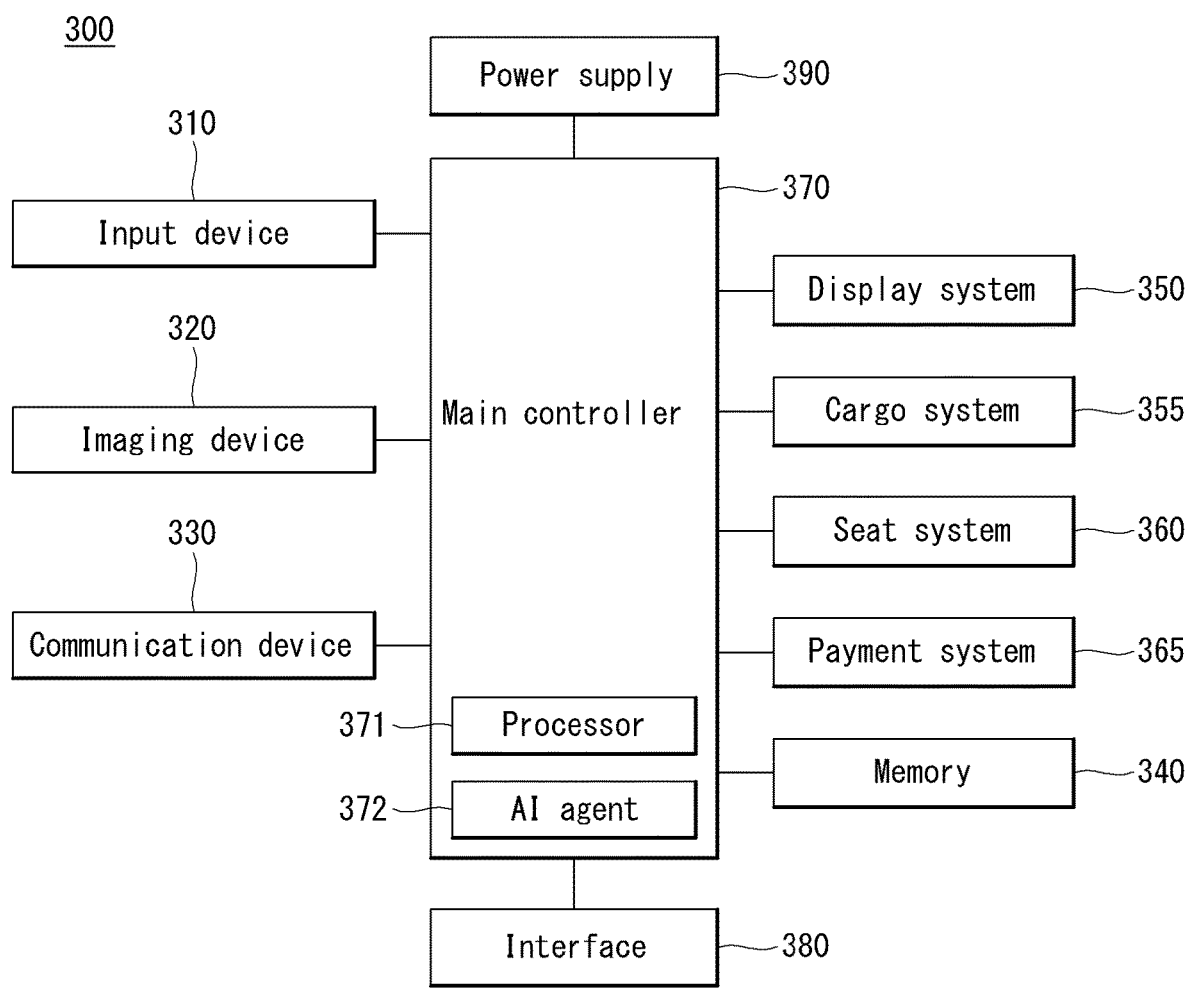

[Figure 11]
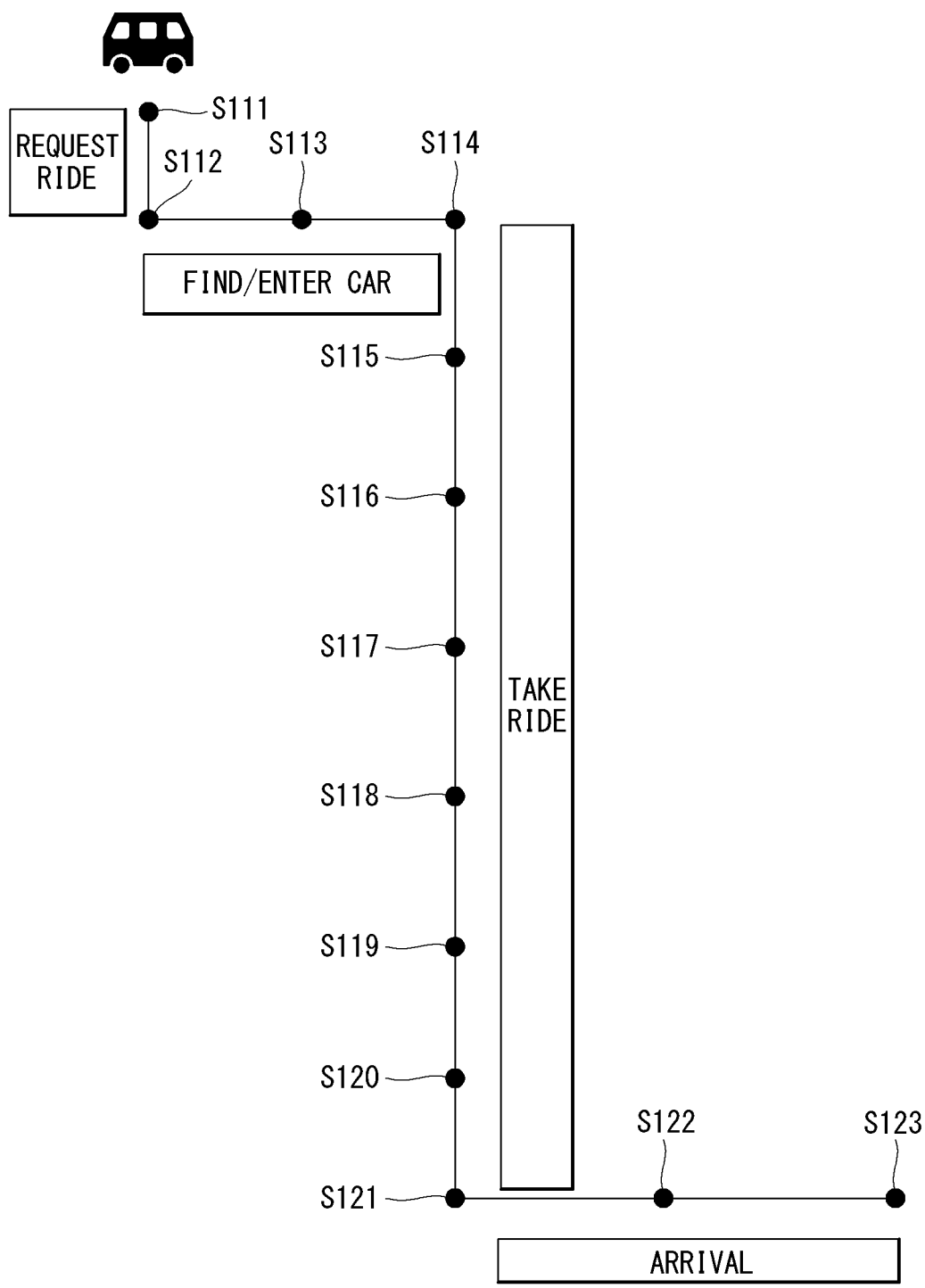

【Figure 12】
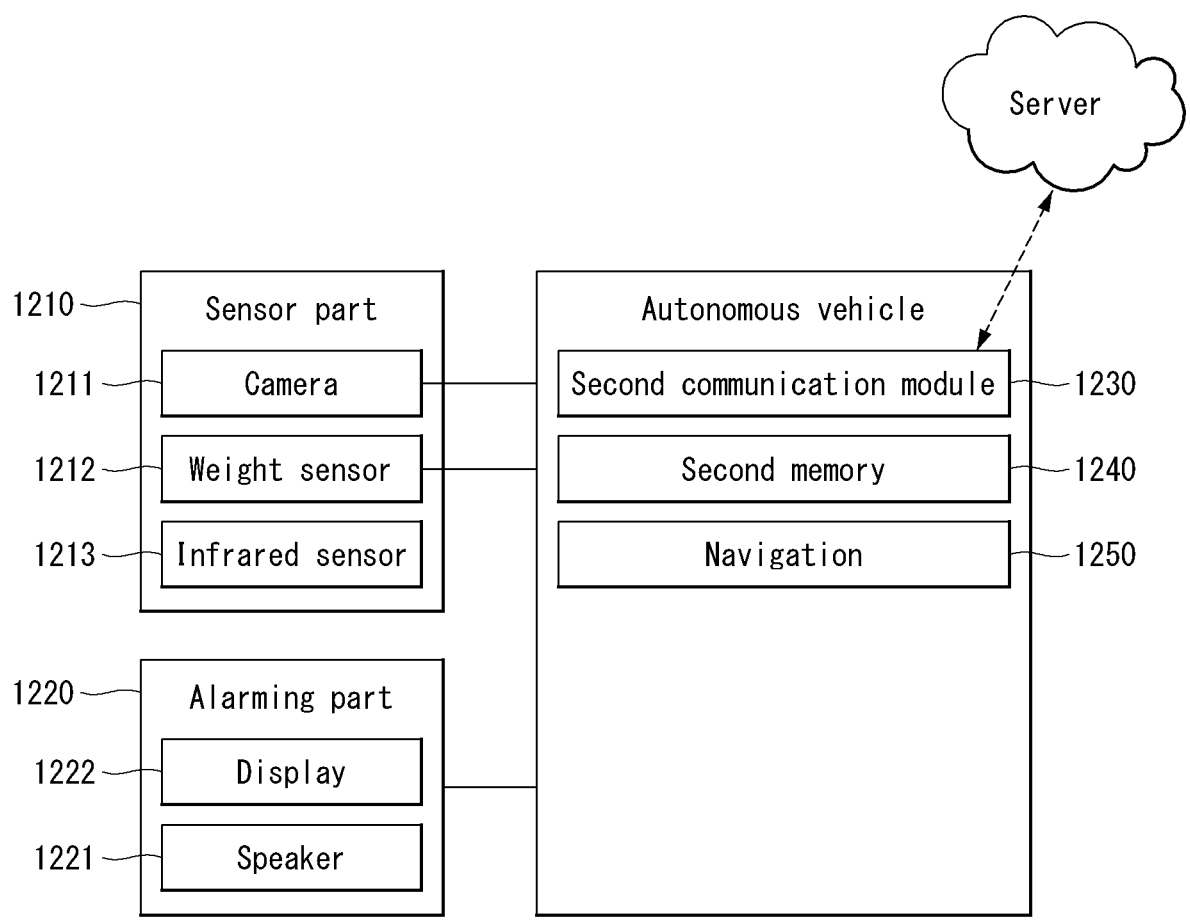

【Figure 13】
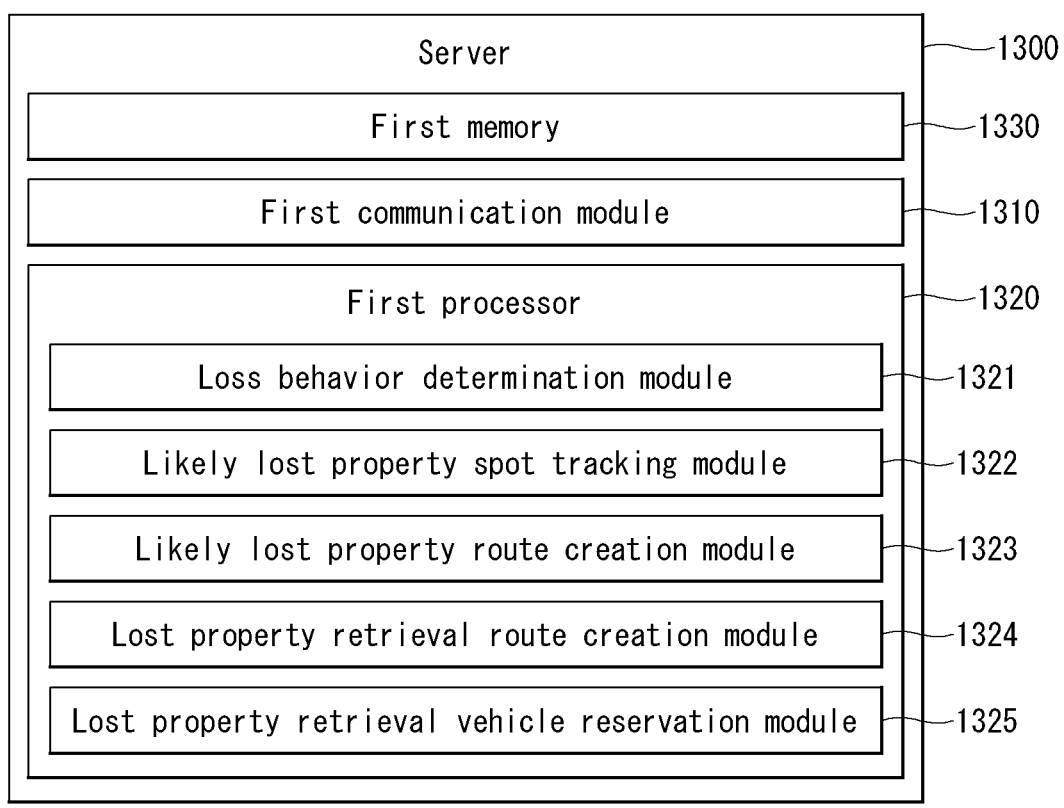

【Figure 14】
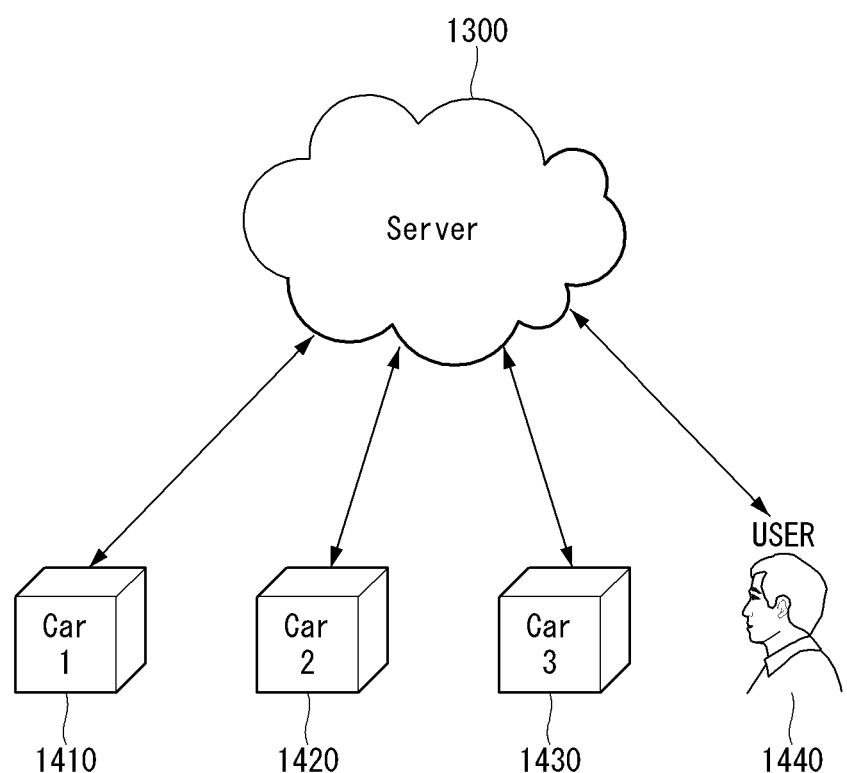

【Figure 15】
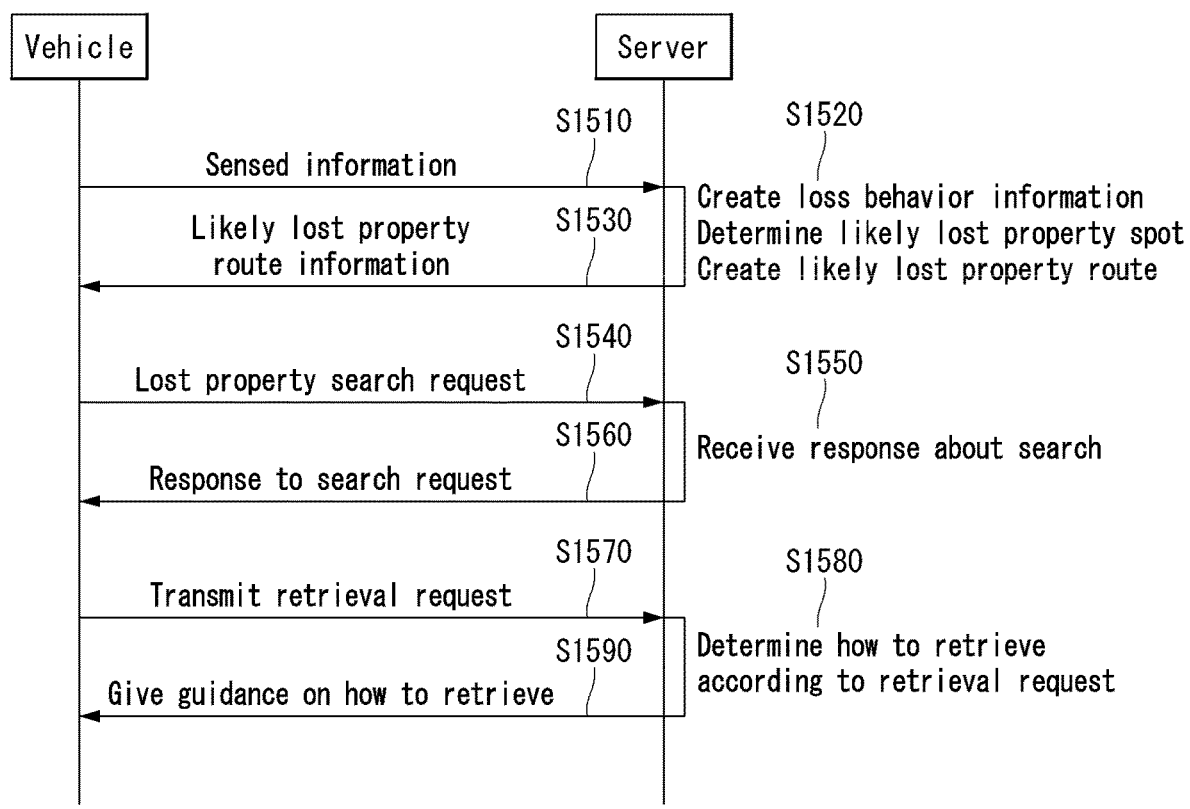

[Figure 16]
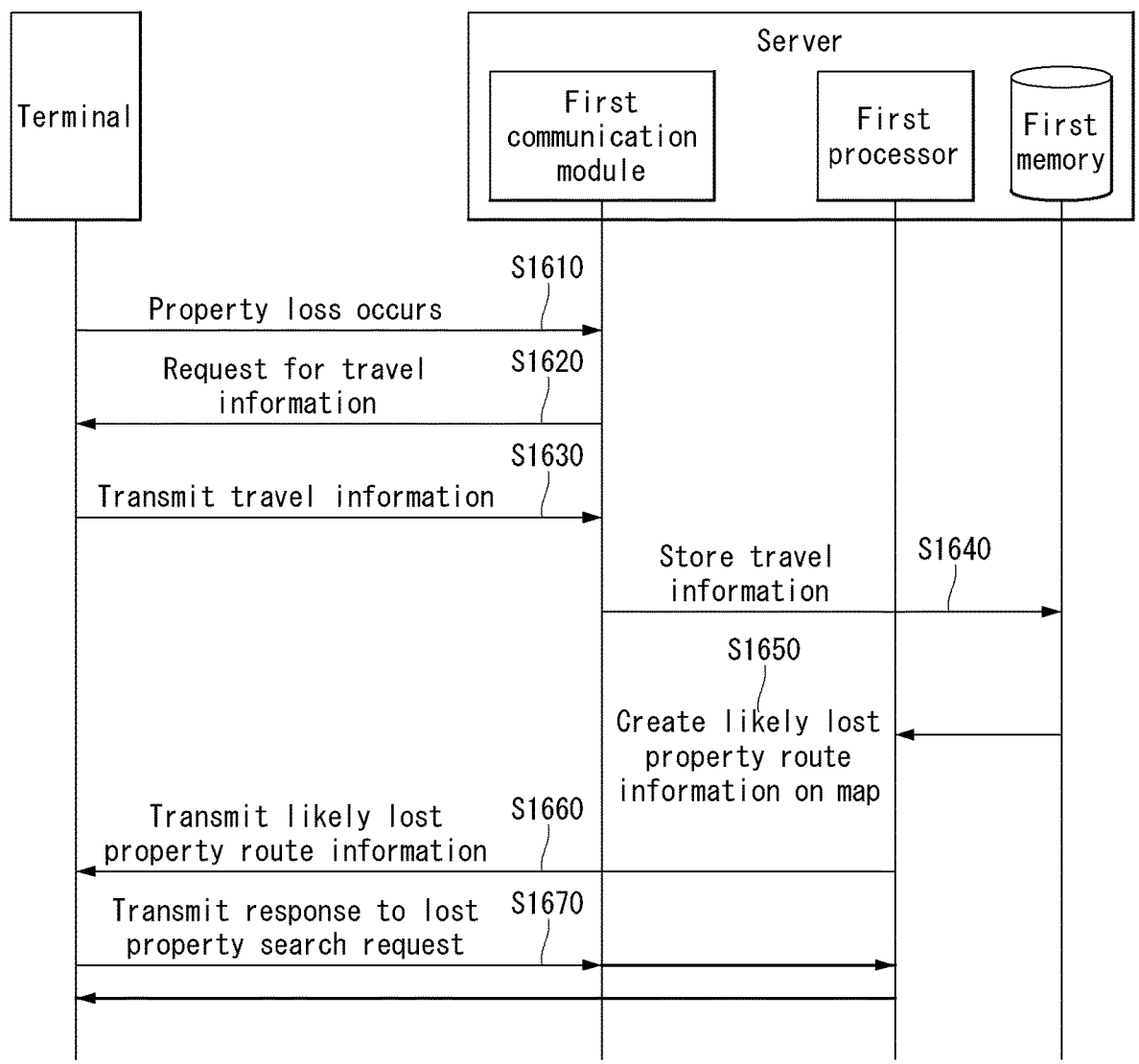

【Figure 17】
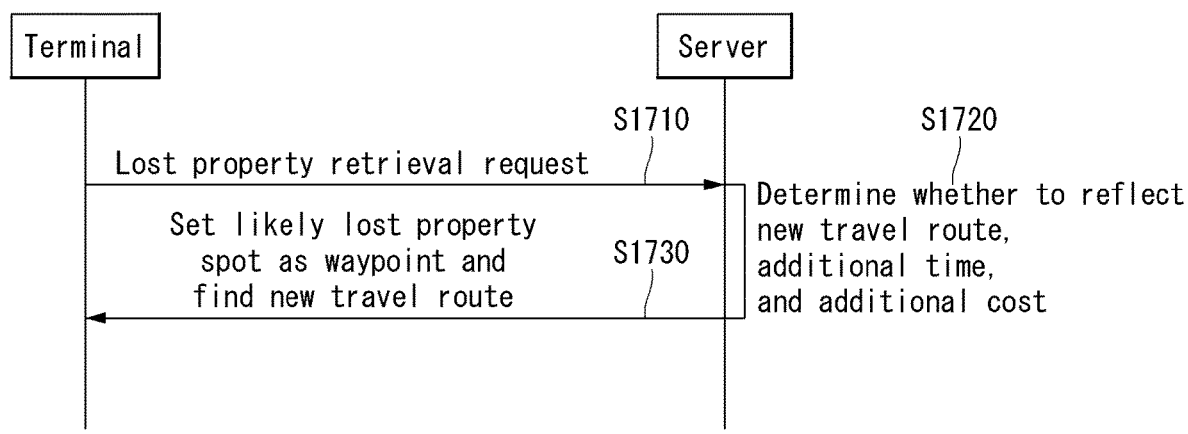

【Figure 18】
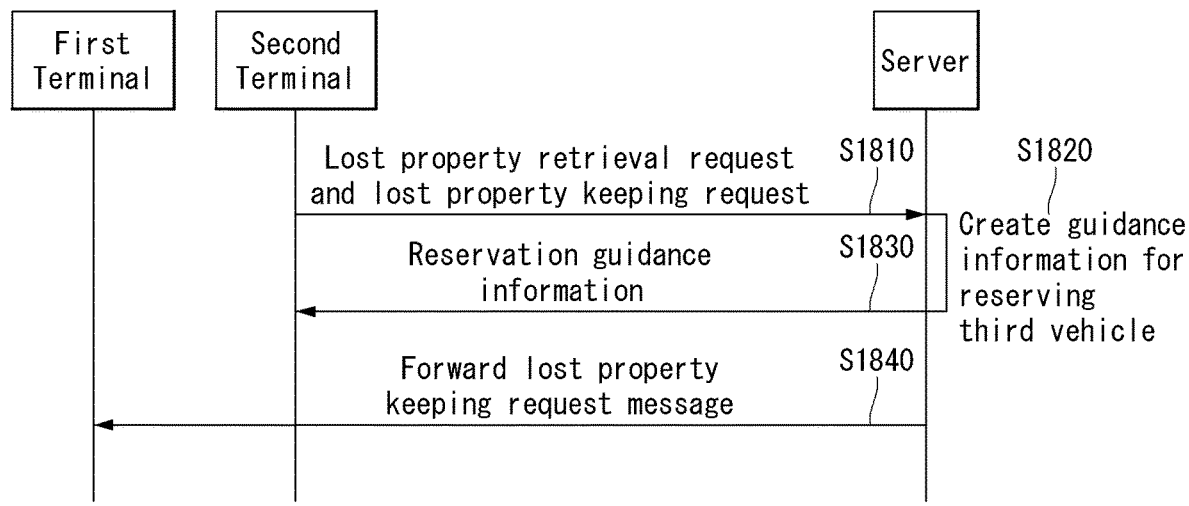
【Figure 19】
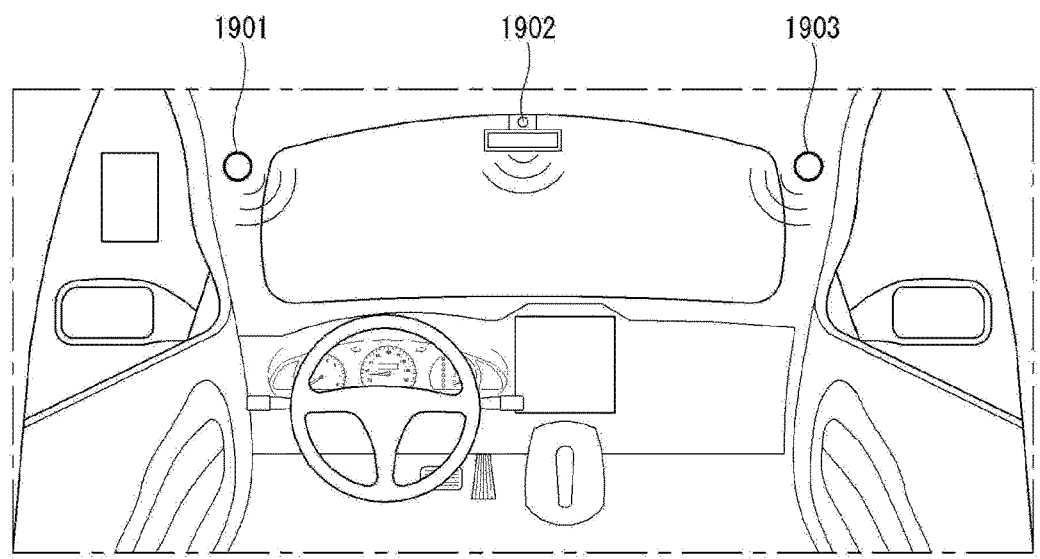

【Figure 20】
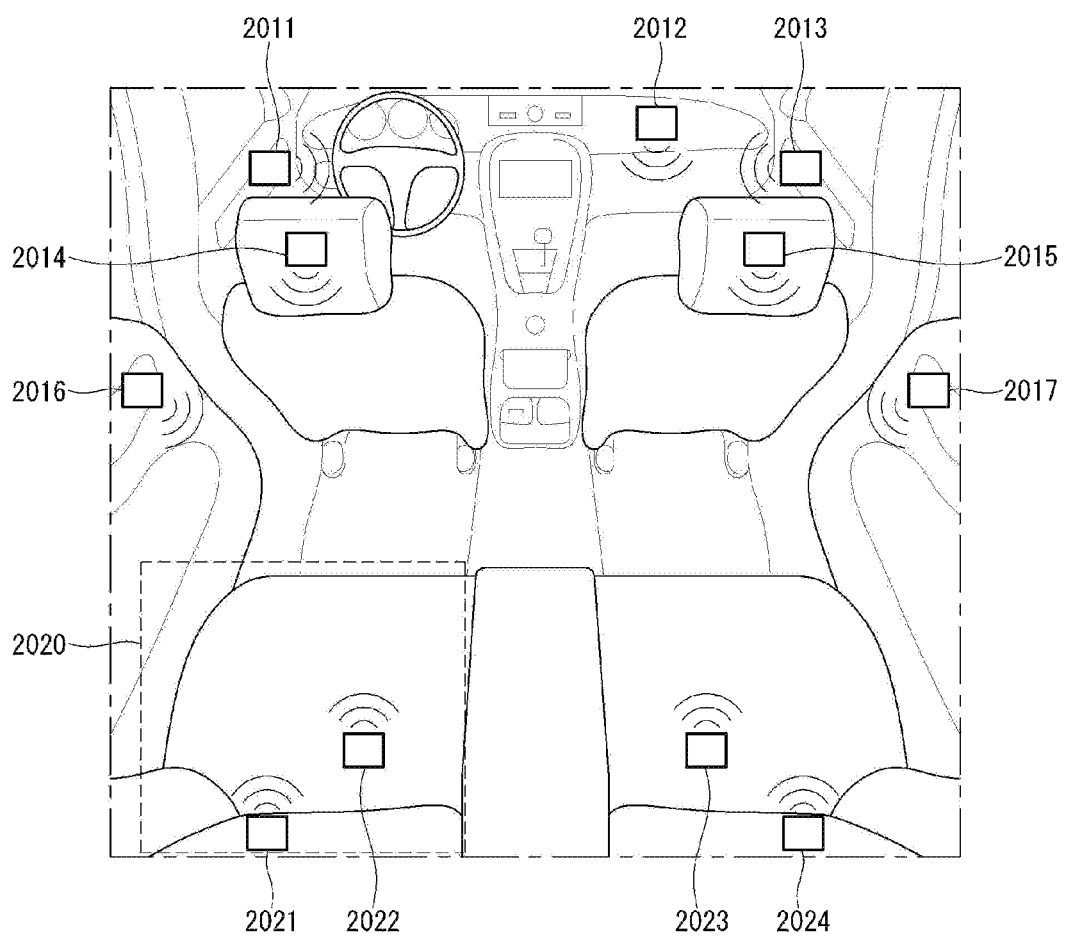

【Figure 21】
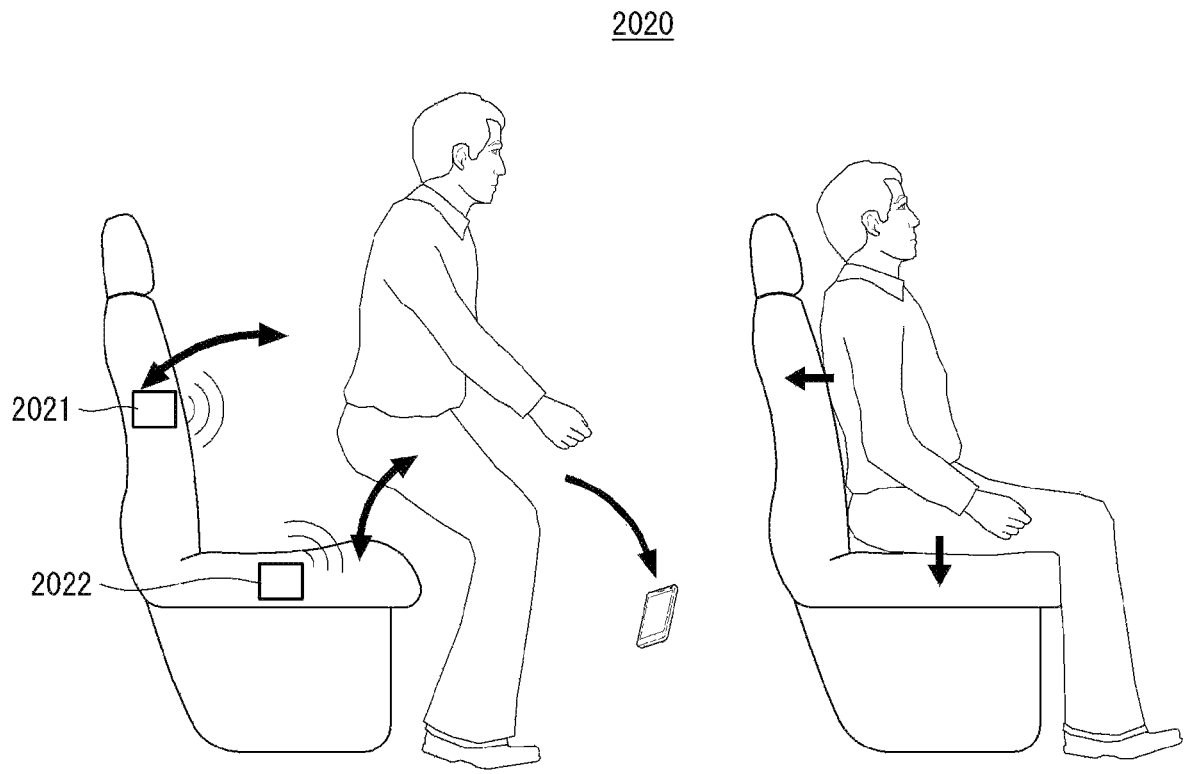
【Figure 22】
(1901, . . . , 1903, 2011, . . . , 2017)
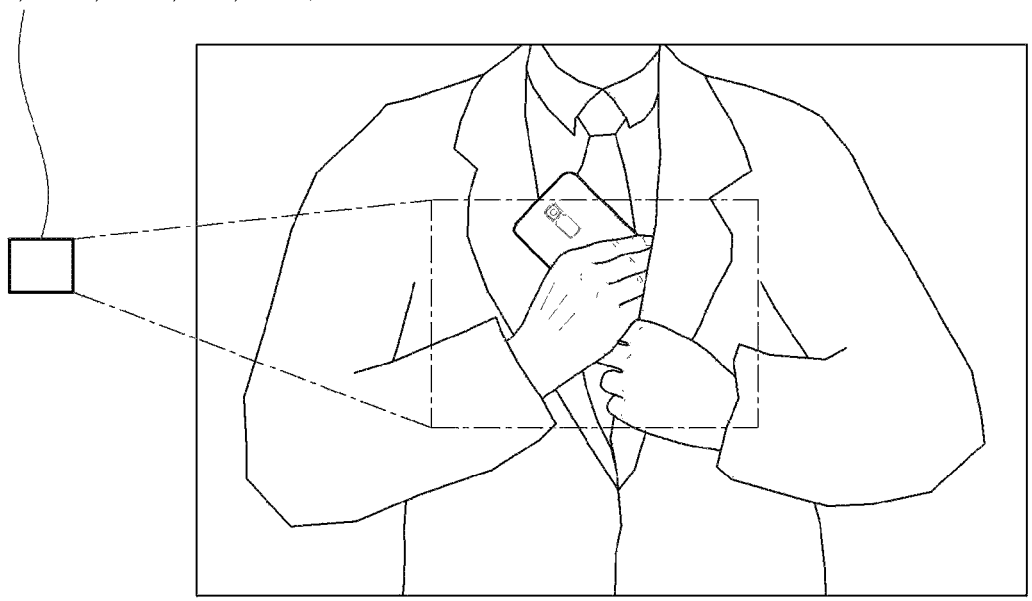

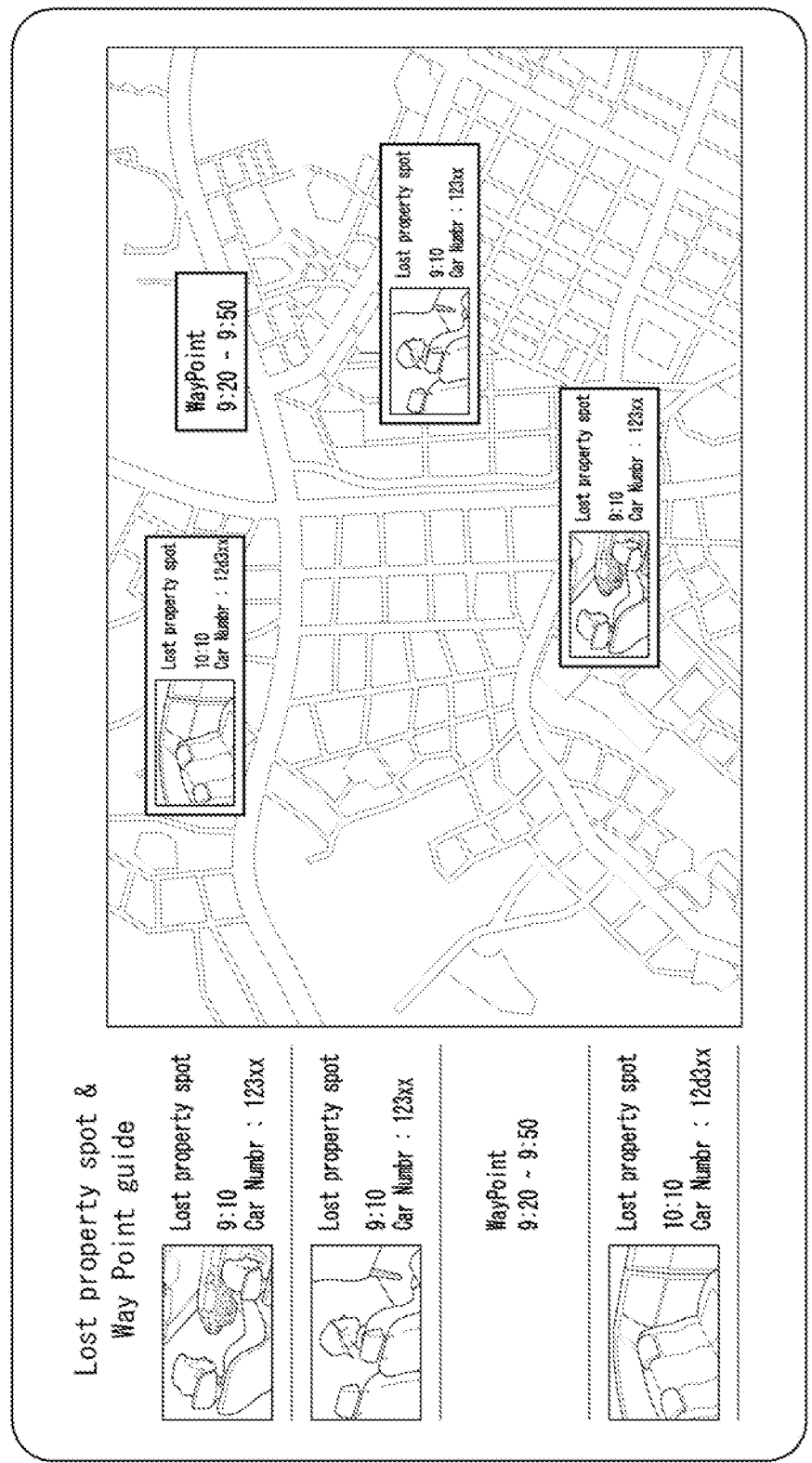
[Figure 23a]

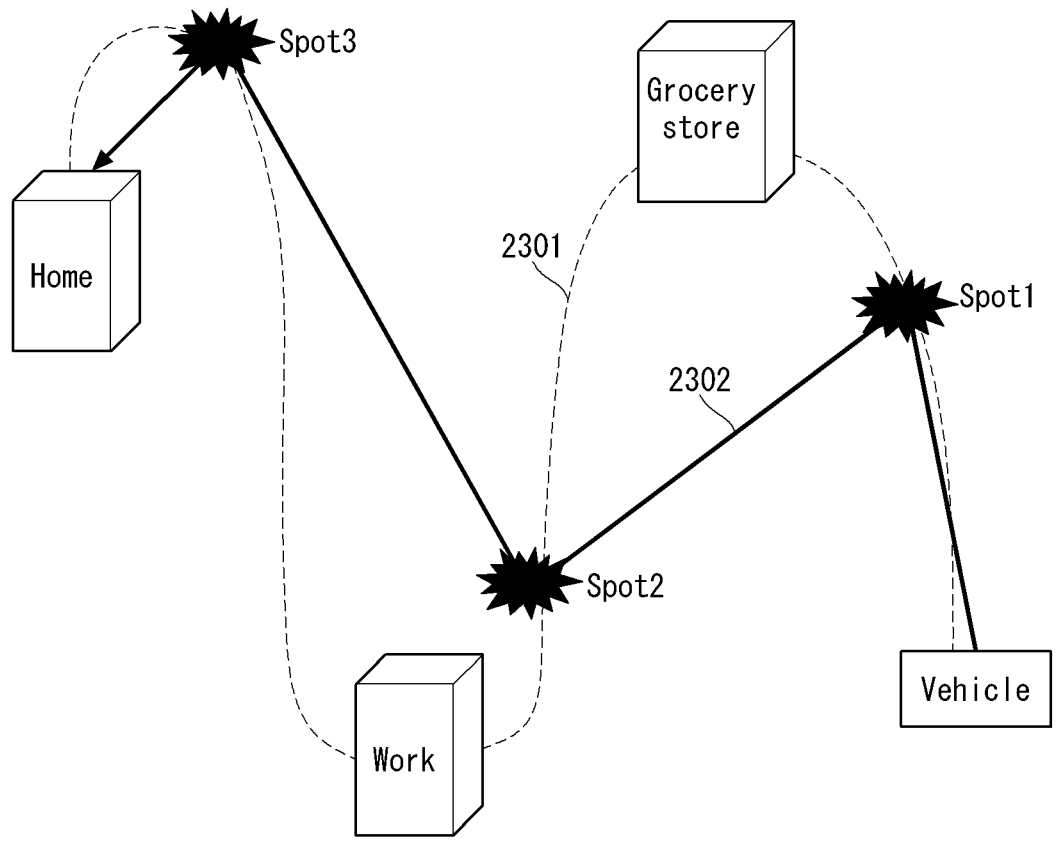
【Figure 23b】

【Figure 23c】
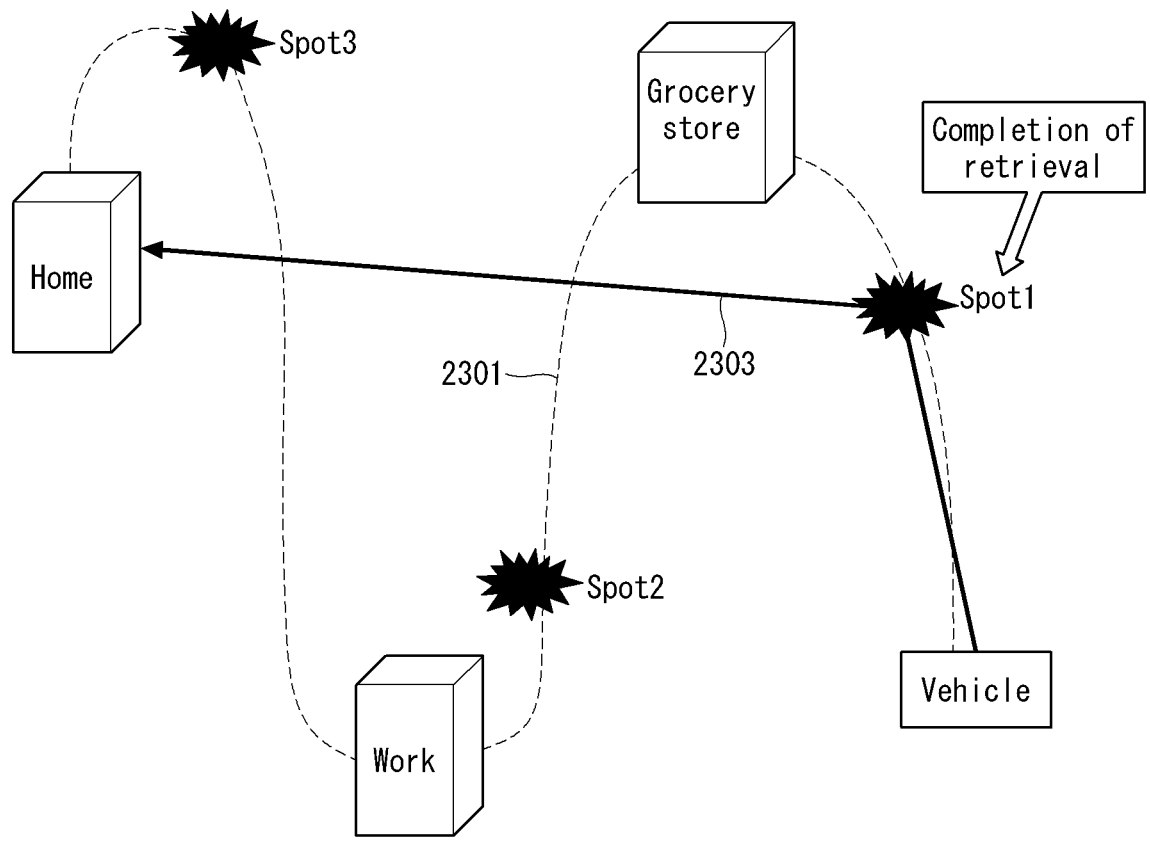

[Figure 25]
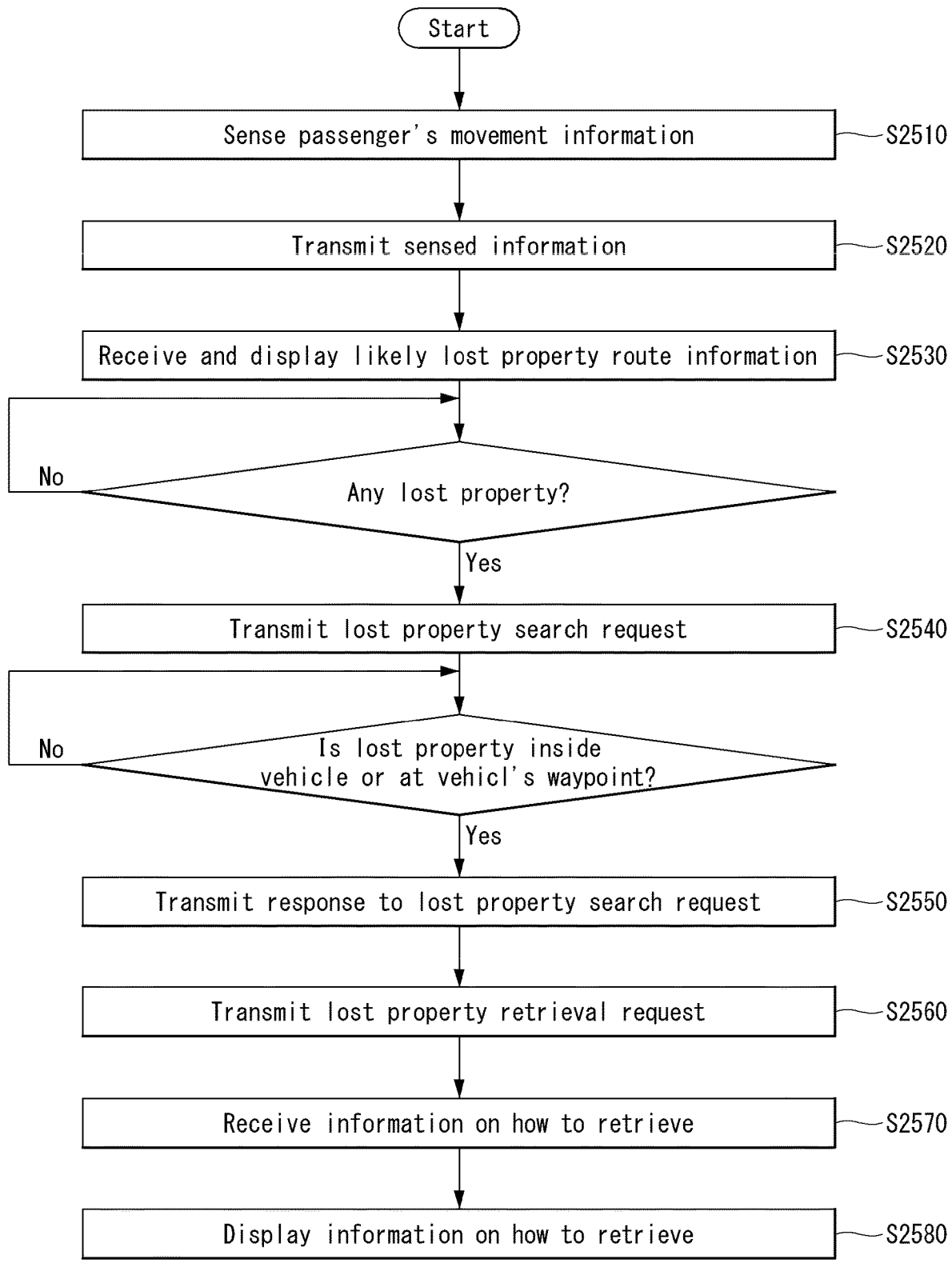

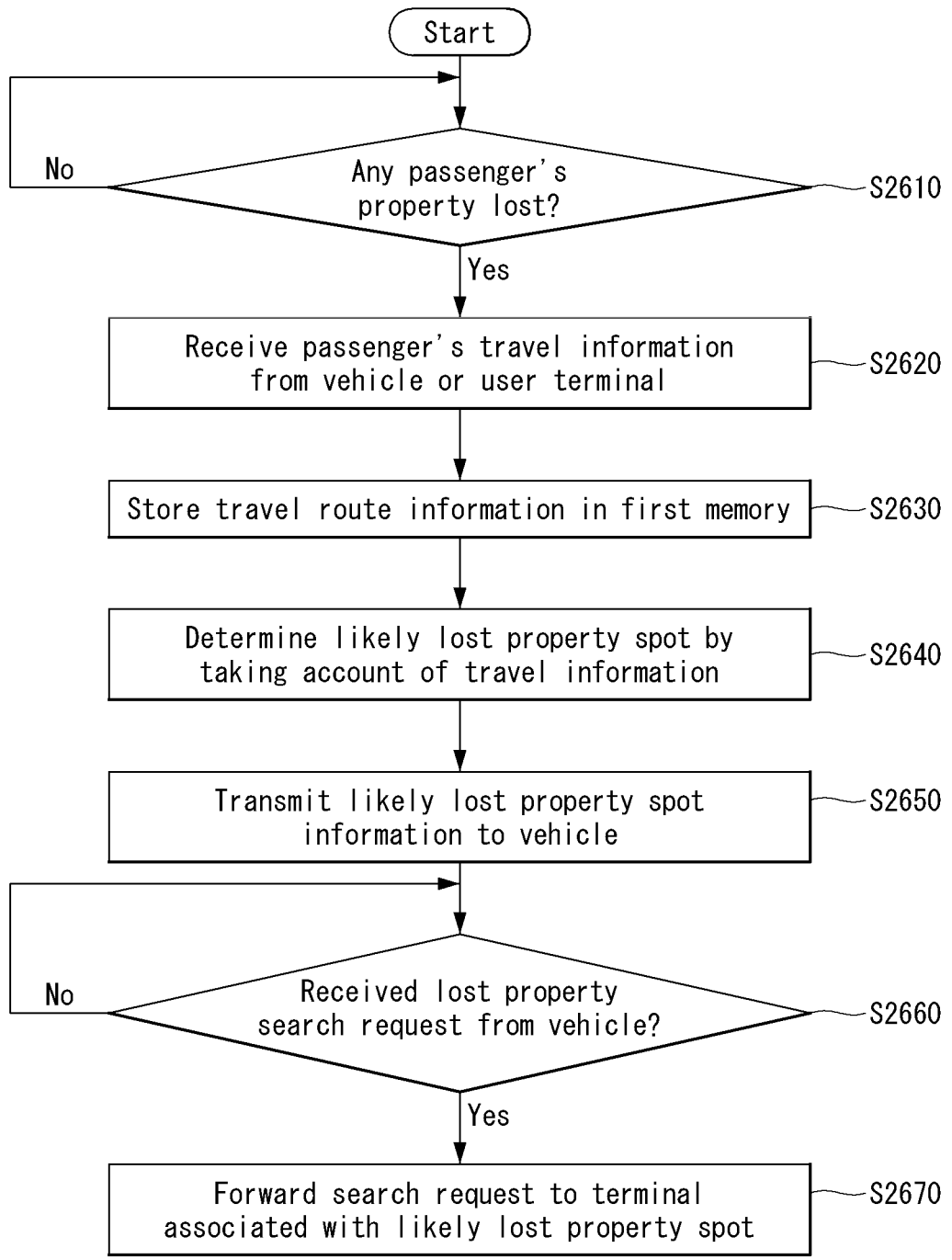
[Figure 26]

【Figure 27a】
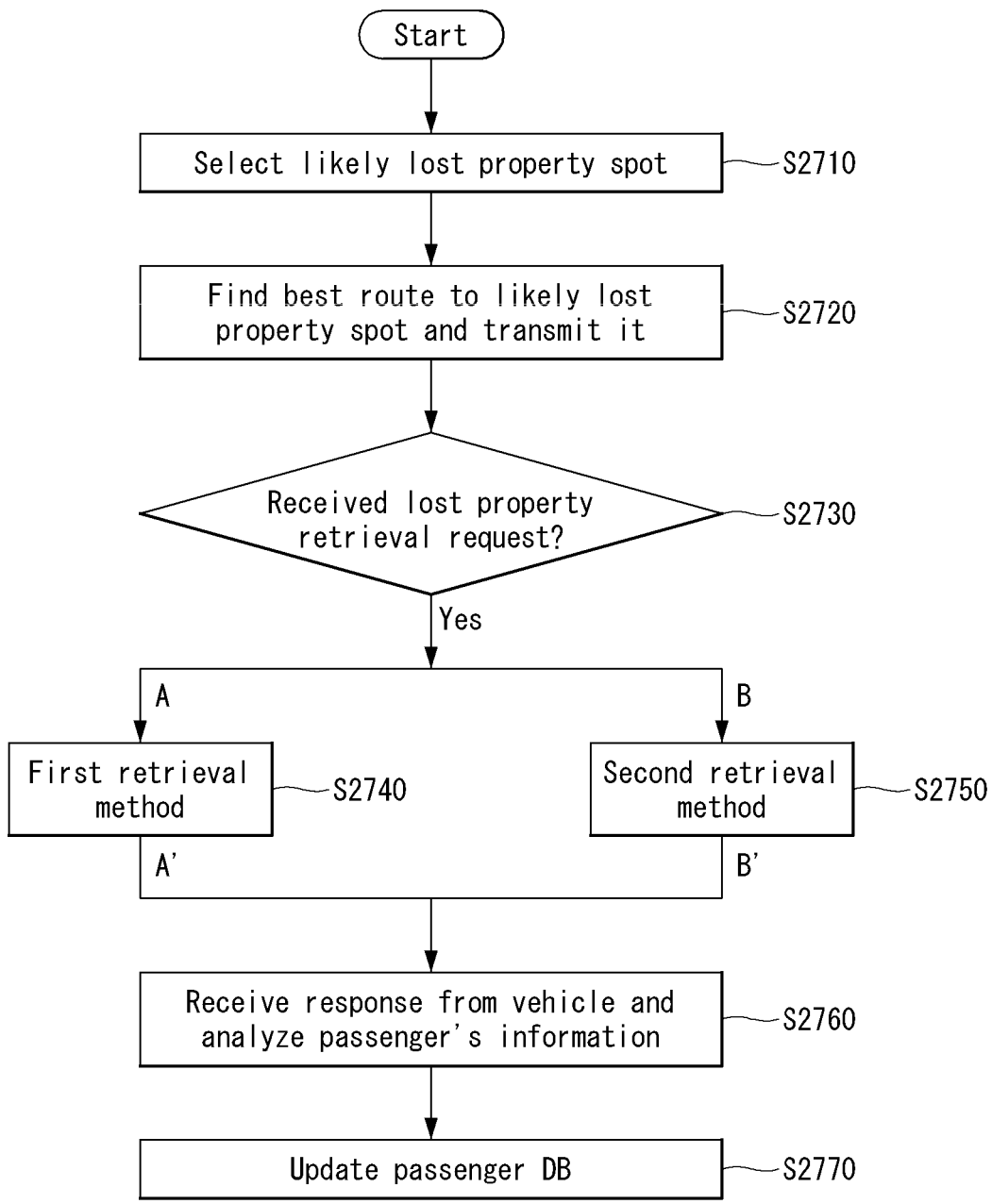

【Figure 27b】
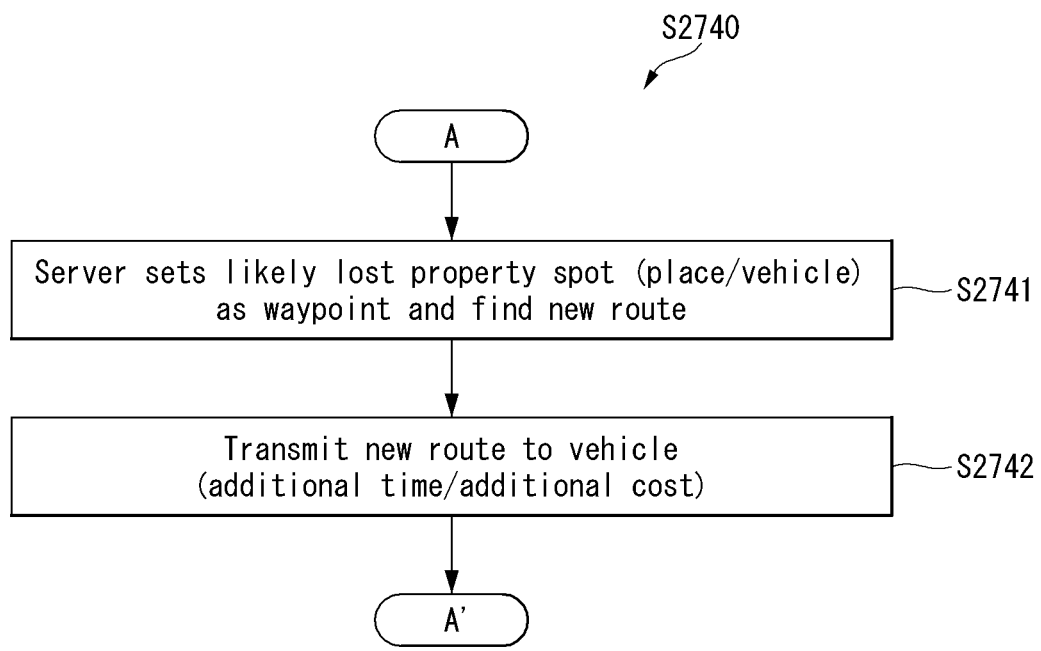

【Figure 27c】
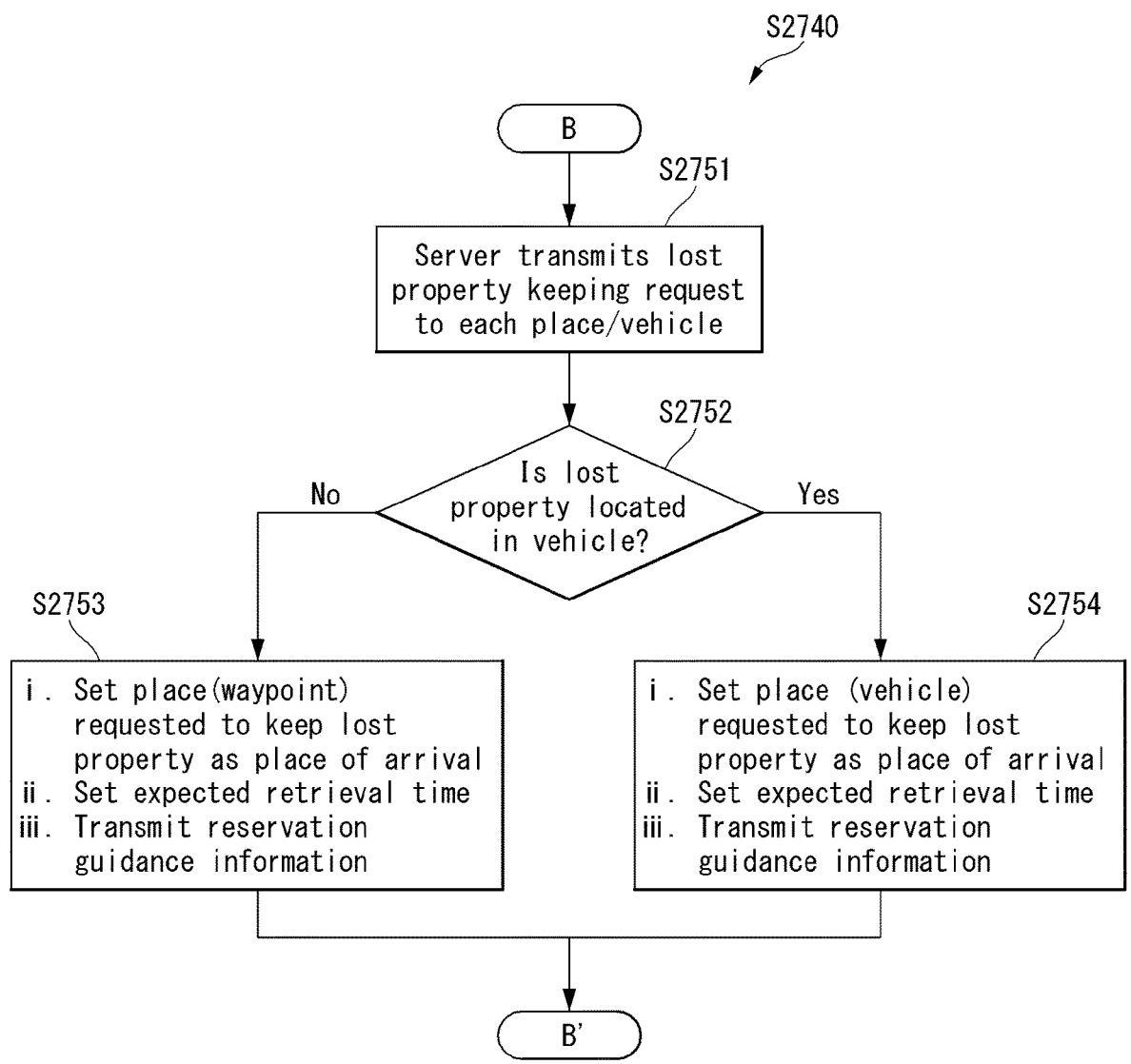

METHOD AND APPARATUS FOR MANAGING LOST PROPERTY IN SHARED AUTONOMOUS VEHICLE

CROSS REFERENCE TO RELATED APPLICATION

This application is the National Phase of PCT International Application No. PCT/KR2019/008930, filed on Jul. 19, 2019, which is hereby expressly incorporated by reference into the present application.

TECHNICAL FIELD

The present invention relates to a method and apparatus for managing lost property in a shared autonomous vehicle and, more particularly, to a method and apparatus for managing lost property in a shared autonomous vehicle, which determine a likely lost property spot based on loss behavior information collected by monitoring the passenger's movements so that the passenger can easily retrieve their lost property.

BACKGROUND ART

Vehicles can be classified into an internal combustion engine vehicle, an external composition engine vehicle, a gas turbine vehicle, an electric vehicle, etc. according to types of motors used therefor.

An autonomous vehicle refers to a self-driving vehicle that can travel without an operation of a driver or a passenger, and automated vehicle & highway systems refer to systems that monitor and control the autonomous vehicle such that the autonomous vehicle can perform self-driving. Such an autonomous vehicle may be used as a privately owned vehicle and also as a vehicle shared by numerous people.

By the way, if someone using a shared autonomous vehicle loses an item in the vehicle, they have to contact the driver to get their lost item back or they have to go to a specified place themselves to search the inside of the vehicle. In this instance, if it is not clear where they left the item behind, it will take some time to keep track of the time and place the item was lost, and, even if they can locate the lost item, it will also take time to retrieve it.

DISCLOSURE

Technical Problem

An aspect of the present invention is to solve the above-described needs and/or problems.

Another aspect of the present invention is to provide a method and apparatus for managing lost property in a shared autonomous vehicle by collecting and sorting information on a passenger's movements in the shared autonomous vehicle so as to collect loss behaviors that make the passenger prone to losing their property.

Another aspect of the present invention is to provide a method and apparatus for managing lost property in a shared autonomous vehicle which can reduce the time and cost it takes to keep track of when and where a passenger lost their property by collecting loss behaviors that make the passenger prone to losing their property and tracking down a corresponding likely lost property spot.

Another aspect of the present invention is to provide a method and apparatus for managing lost property in a shared autonomous vehicle which can minimize a passenger's unnecessary movements by tracking down a likely lost property spot and sending lost property search and retrieval requests to the likely lost property spot to retrieve lost property from the likely lost property spot.

Another aspect of the present invention is to provide a method and apparatus for managing lost property in a shared autonomous vehicle which can efficiently manage a passenger's path of travel by sending a request to keep the passenger's lost property upon finding it or reflecting the lost property on a travel route later.

Another aspect of the present invention is to provide a method and apparatus for managing lost property in a shared autonomous vehicle which can resolve problems following a passenger's service use by saving the passenger's service use history.

Technical problems to be solved by the present invention are not limited to the above-mentioned technical problems, and other technical problems not mentioned herein may be clearly understood by those skilled in the art from description below.

Technical Solution

An exemplary embodiment of the present invention provides a method for managing lost property in a shared autonomous vehicle, the method including: receiving a passenger's information sensed by a sensor in the vehicle; creating loss behavior information from the sensed information, the loss behavior information being classified as a behavior pattern that makes the passenger prone to losing their property; determining at least one likely lost property spot including the vehicle's waypoint information, based on the loss behavior information; creating likely lost property spot information by taking account of the at least one likely lost property spot; creating a likely lost property route including the likely lost property spot information; transmitting the created likely lost property route to the vehicle; receiving a lost property search request from the vehicle and transmitting the same to a terminal associated with the likely lost property spot; and receiving a lost property retrieval request from the vehicle and giving guidance on how to retrieve the lost property depending on the type of the retrieval request.

The vehicle may include a first vehicle and a second vehicle the user rides in at a later time than the first vehicle.

The sensor may include at least one among a first sensor for detecting the passenger's gestures, a second sensor for detecting the seat angle in the vehicle, a third sensor for detecting a shift in the seat's center of gravity, and a fourth sensor for detecting a change in the position of the seat.

The likely lost property spot may include at least one between the vehicle's location at the time of a detected loss behavior and a waypoint on the vehicle's travel route.

The likely lost property spot information may include at least one among the time a loss behavior occurred at the likely lost property spot, an image of the loss behavior captured by the sensor in the vehicle, the type of the vehicle, and the registration number of the vehicle.

The method may further include transmitting the likely lost property spot information to at least one between the vehicle and the passenger's mobile terminal, in order to display the likely lost property spot information on the vehicle or mobile terminal when the passenger gets off the vehicle.

The retrieval request may include at least one among the passenger's information, information about the lost property, the likely lost property spot information, and the time of day the vehicle was used.

The determining of a likely lost property spot may include: receiving a loss occurrence message from the vehicle or mobile terminal; transmitting to the vehicle or the passenger's mobile terminal a message requesting a travel route taken at the time of the loss and receiving a message as a response to the travel route request message; and determining a likely lost property spot by taking account of information on the travel route taken at the time of the loss, along with the loss behavior information.

The receiving of a lost property search request and the transmitting of the same to the vehicle may further include transmitting the lost property search request to the vehicle and at the same time to a waypoint located on the vehicle's travel route.

The method of retrieving the lost property may include: a first retrieval method for retrieving the lost property by finding a new travel route including the likely lost property spot; and a second retrieval method for retrieving the lost property by sending a lost property keeping request and then reserving a third vehicle.

The first retrieval method may include: receiving information on a likely lost property spot selected from among the at least one likely lost property spot; forwarding the information on the selected likely lost property spot to the vehicle; finding a new travel route by setting the selected likely lost property spot as a waypoint and setting a prearranged destination as a place of arrival; and transmitting to the vehicle a first message containing information on the new travel route, additional time information, and additional cost information.

The second retrieval method may include: receiving information on a likely lost property spot selected from among the at least one likely lost property spot; forwarding the information on the selected likely lost property spot to the vehicle; transmitting a lost property keeping request to a terminal associated with the selected likely lost property spot; creating guidance information for reserving a third vehicle by setting the place requested to keep the lost property as a waypoint or a place of arrival and setting an expected retrieval time; transmitting a second message containing the reservation guidance information to the vehicle.

The method may further include: receiving a third message from the vehicle in response to the first message; analyzing the passenger's information based on the passenger's lost property-related history; and storing the analyzed information on the passenger.

The method may further include: receiving a fourth message from the vehicle in response to the second message; analyzing the passenger's information based on the passenger's lost property-related history; and storing the analyzed information on the passenger.

The method may further include, once the lost property is retrieved from one of the at least one selected likely lost property spot, finding a new travel route by setting the place the lost property is retrieved as a new place of departure and setting the existing destination as a place of arrival.

Another exemplary embodiment of the present invention provides a method for managing lost property in a shared autonomous vehicle, the method including: sensing a passenger's movements by a sensor in the vehicle; transmitting sensed information to a server; receiving a likely lost property route including likely lost property spot information from the server and transmitting a lost property search request to the server based on the likely lost property route; receiving a response to the lost property search request from the server and transmitting a lost property retrieval request to the server; receiving information on how to retrieve the lost property depending on the type of the retrieval request; and displaying the information on how to retrieve the lost property through an alarming part.

Still another exemplary embodiment of the present invention provides a lost property management server for managing lost property in a shared autonomous vehicle, including: a first communication module; a first memory; and a first processor, wherein the first memory stores information sensed by a sensor in the vehicle or travel route information transmitted from a passenger's terminal, and the first processor creates loss behavior information from the sensed information, the loss behavior information being classified as a behavior pattern that makes the passenger prone to losing their property, determines a likely lost property spot based on the loss behavior information, determines at least one lost property spot including the vehicle's waypoint, creates likely lost property spot information by taking account of the at least one likely lost property spot, and determines how to retrieve the lost property upon receiving a lost property retrieval request from the vehicle.

Advantageous Effects

Advantageous effects of a method and apparatus for managing lost property in a shared autonomous vehicle will be described below.

The present invention can collect and sort information on a passenger's movements in the shared autonomous vehicle so as to collect loss behaviors that make the passenger prone to losing their property.

The present invention can reduce the time and cost it takes to keep track of when and where a passenger lost their property by collecting loss behaviors that make the passenger prone to losing their property and tracking down a corresponding likely lost property spot.

The present invention can minimize a passenger's unnecessary movements by tracking down a likely lost property spot and sending lost property search and retrieval requests to the likely lost property spot to retrieve lost property from the likely lost property spot.

The present invention can efficiently manage a passenger's path of movement by sending a request to keep the passenger's lost property upon finding it or reflecting the lost property on a travel route later.

The present invention can resolve problems following a passenger's service use by saving the passenger's service use history.

The effects that may be obtained by the present invention are not limited to the above-mentioned effects, and other effects not mentioned above will be clearly understood by those skilled in the art from the following description.

DESCRIPTION OF DRAWINGS

FIG. 1 is a block diagram of a wireless communication system to which methods proposed in the disclosure are applicable.

FIG. 2 shows an example of a signal transmission/reception method in a wireless communication system.

FIG. 3 shows an example of basic operations of an autonomous vehicle and a 5G network in a 5G communication system.

FIG. 4 shows an example of a basic operation between vehicles using 5G communication.

FIG. 5 illustrates a vehicle according to an embodiment of the present invention.

FIG. 6 is a control block diagram of the vehicle according to an embodiment of the present invention.

FIG. 7 is a control block diagram of an autonomous device according to an embodiment of the present invention.

FIG. 8 is a diagram showing a signal flow in an autonomous vehicle according to an embodiment of the present invention.

FIG. 9 is a diagram illustrating the interior of a vehicle according to an embodiment of the present invention.

FIG. 10 is a block diagram referred to in description of a cabin system for a vehicle according to an embodiment of the present invention.

FIG. 11 is a diagram referred to in description of a usage scenario of a user according to an embodiment of the present invention.

FIG. 12 is a block diagram of an autonomous vehicle for managing lost property, that is applicable in the present invention.

FIG. 13 is a block diagram of a lost property location tracking server applicable to the present invention.

FIG. 14 is a view showing a system between autonomous vehicles, a server, and a mobile terminal according to an exemplary embodiment of the present invention.

FIG. 15 shows a data processing method according to an exemplary embodiment of the present invention.

FIG. 16 is a sequence diagram of a lost property search request according to an exemplary embodiment of the present invention.

FIG. 17 is a sequence diagram of a lost property retrieval request according to an exemplary embodiment of the present invention.

FIG. 18 is a sequence diagram of a lost property retrieval request according to an exemplary embodiment of the present invention.

FIGS. 19 and 20 are views showing a sensor capable of detecting a passenger's movement information, that is applicable to the present invention.

FIG. 21 shows an example of a method for detecting a passenger's behavior by a sensor at a vehicle seat, that is applicable to the present invention.

FIG. 22 shows an example of a method for detecting a passenger's behavior by a sensor for tracking the passenger's hands, that is applicable to the present invention.

FIG. 23a shows an example of a method for displaying a passenger's likely lost property spots and route through a display in a vehicle, that is applicable to the present invention.

FIG. 23b shows an example of a method for finding a new travel route when retrieving lost property, that is applicable to the present invention.

FIG. 23c shows an example of a method for finding a new travel route upon completion of retrieval of lost property, that is applicable to the present invention.

FIG. 25 shows a method for processing data from a vehicle's point of view according to an exemplary embodiment of the present invention.

FIG. 26 shows a method for processing data from a system's point of view according to an exemplary embodiment of the present invention.

FIGS. 27a to 27c show a method for processing data from a system's point of view according to an exemplary embodiment of the present invention.

Figure 24:
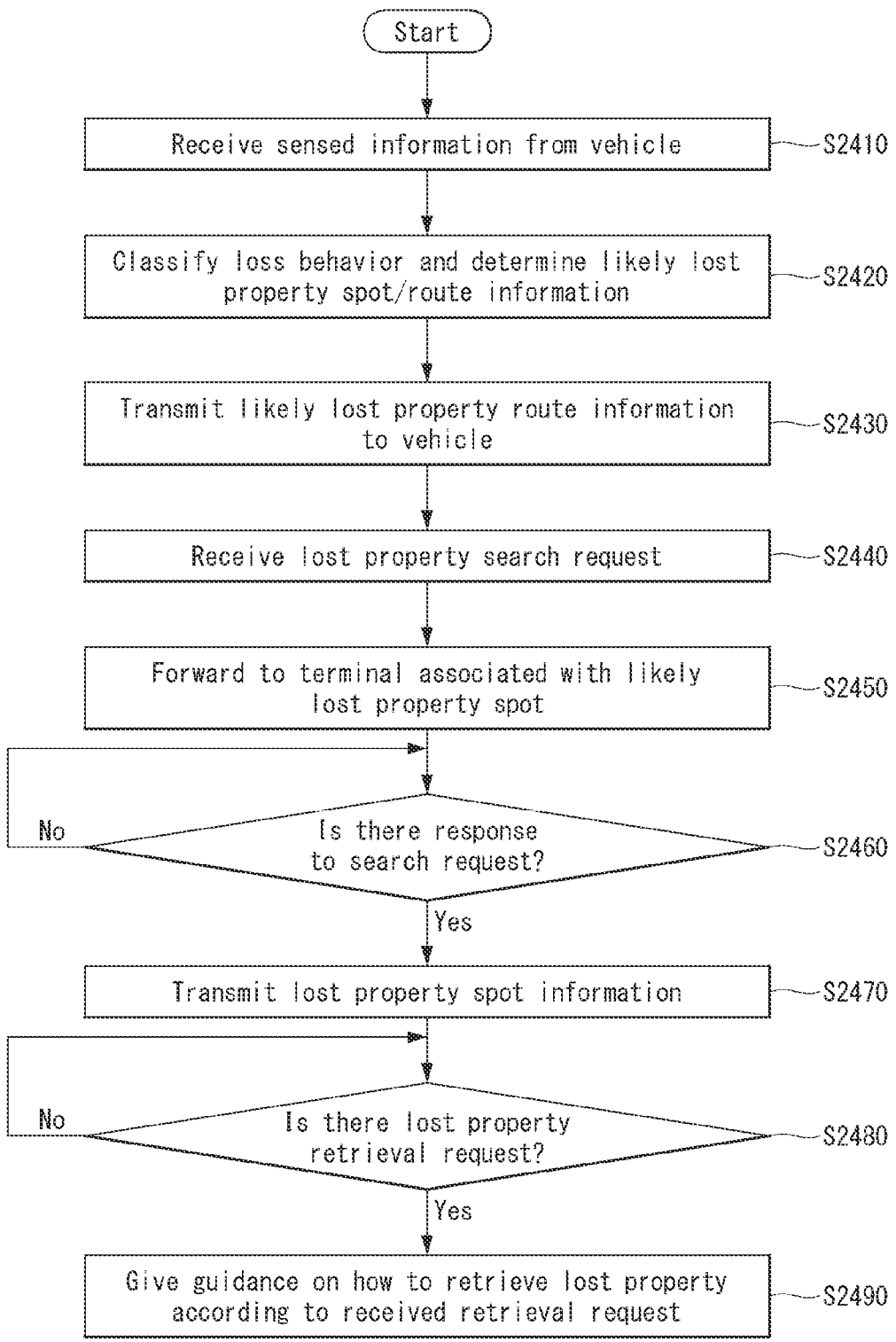
FIG. 24 shows a method for processing data from a server's point of view according to an exemplary embodiment of the present invention.

To facilitate understanding of the present disclosure, the accompanying drawings included as part of the detailed description will present some embodiments of the present disclosure and an explanation of the technical idea of the present disclosure in conjunction with the detailed description.

MODE FOR INVENTION

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH of an SSB. SIB1 includes information related to transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1, SSBx2, SSBx3, SSBx4, ... }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

H. Autonomous Driving Operation Between Vehicles Using 5G Communication

FIG. 4 shows an example of a basic operation between vehicles using 5G communication.

A first vehicle transmits specific information to a second vehicle (S61). The second vehicle transmits a response to the specific information to the first vehicle (S62).

Meanwhile, a configuration of an applied operation between vehicles may depend on whether the 5G network is directly (sidelink communication transmission mode 3) or indirectly (sidelink communication transmission mode 4) involved in resource allocation for the specific information and the response to the specific information.

Next, an applied operation between vehicles using 5G communication will be described.

First, a method in which a 5G network is directly involved in resource allocation for signal transmission/reception between vehicles will be described.

The 5G network can transmit DCI format 5A to the first vehicle for scheduling of mode-3 transmission (PSCCH and/or PSSCH transmission). Here, a physical sidelink control channel (PSCCH) is a 5G physical channel for scheduling of transmission of specific information a physical sidelink shared channel (PSSCH) is a 5G physical channel for transmission of specific information. In addition, the first vehicle transmits SCI format 1 for scheduling of specific information transmission to the second vehicle over a PSCCH. Then, the first vehicle transmits the specific information to the second vehicle over a PSSCH.

Next, a method in which a 5G network is indirectly involved in resource allocation for signal transmission/reception will be described.

The first vehicle senses resources for mode-4 transmission in a first window. Then, the first vehicle selects resources for mode-4 transmission in a second window on the basis of the sensing result. Here, the first window refers to a sensing window and the second window refers to a selection window. The first vehicle transmits SCI format 1 for scheduling of transmission of specific information to the second vehicle over a PSCCH on the basis of the selected resources. Then, the first vehicle transmits the specific information to the second vehicle over a PSSCH.

The above-described 5G communication technology can be combined with methods proposed in the present invention which will be described later and applied or can complement the methods proposed in the present invention to make technical features of the methods concrete and clear.

Driving (1) Exterior of Vehicle

FIG. 5 is a diagram showing a vehicle according to an embodiment of the present invention.

Referring to FIG. 5, a vehicle 10 according to an embodiment of the present invention is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

(2) Components of Vehicle

FIG. 6 is a control block diagram of the vehicle according to an embodiment of the present invention.

Referring to FIG. 6, the vehicle 10 may include a user interface device 200, an object detection device 210, a communication device 220, a driving operation device 230, a main ECU 240, a driving control device 250, an autonomous device 260, a sensing unit 270, and a position data generation device 280. The object detection device 210, the communication device 220, the driving operation device 230, the main ECU 240, the driving control device 250, the autonomous device 260, the sensing unit 270 and the position data generation device 280 may be realized by electronic devices which generate electric signals and exchange the electric signals from one another.

1) User Interface Device

The user interface device 200 is a device for communication between the vehicle 10 and a user. The user interface device 200 can receive user input and provide information generated in the vehicle 10 to the user. The vehicle 10 can realize a user interface (UI) or user experience (UX) through the user interface device 200. The user interface device 200 may include an input device, an output device and a user monitoring device.

2) Object Detection Device

The object detection device 210 can generate information about objects outside the vehicle 10. Information about an object can include at least one of information on presence or absence of the object, positional information of the object, information on a distance between the vehicle 10 and the object, and information on a relative speed of the vehicle 10 with respect to the object. The object detection device 210 can detect objects outside the vehicle 10. The object detection device 210 may include at least one sensor which can detect objects outside the vehicle 10. The object detection device 210 may include at least one of a camera, a radar, a lidar, an ultrasonic sensor and an infrared sensor. The object detection device 210 can provide data about an object generated on the basis of a sensing signal generated from a sensor to at least one electronic device included in the vehicle.

2.1) Camera

The camera can generate information about objects outside the vehicle 10 using images. The camera may include at least one lens, at least one image sensor, and at least one processor which is electrically connected to the image sensor, processes received signals and generates data about objects on the basis of the processed signals.

The camera may be at least one of a mono camera, a stereo camera and an around view monitoring (AVM) camera. The camera can acquire positional information of objects, information on distances to objects, or information on relative speeds with respect to objects using various image processing algorithms. For example, the camera can acquire information on a distance to an object and information on a relative speed with respect to the object from an acquired image on the basis of change in the size of the object over time. For example, the camera may acquire information on a distance to an object and information on a relative speed with respect to the object through a pin-hole model, road profiling, or the like. For example, the camera may acquire information on a distance to an object and information on a relative speed with respect to the object from a stereo image acquired from a stereo camera on the basis of disparity information.

The camera may be attached at a portion of the vehicle at which FOV (field of view) can be secured in order to photograph the outside of the vehicle. The camera may be disposed in proximity to the front windshield inside the vehicle in order to acquire front view images of the vehicle. The camera may be disposed near a front bumper or a radiator grill. The camera may be disposed in proximity to a rear glass inside the vehicle in order to acquire rear view images of the vehicle. The camera may be disposed near a rear bumper, a trunk or a tail gate. The camera may be disposed in proximity to at least one of side windows inside the vehicle in order to acquire side view images of the vehicle. Alternatively, the camera may be disposed near a side mirror, a fender or a door.

2.2) Radar

The radar can generate information about an object outside the vehicle using electromagnetic waves. The radar may include an electromagnetic wave transmitter, an electromagnetic wave receiver, and at least one processor which is electrically connected to the electromagnetic wave transmitter and the electromagnetic wave receiver, processes received signals and generates data about an object on the basis of the processed signals. The radar may be realized as a pulse radar or a continuous wave radar in terms of electromagnetic wave emission. The continuous wave radar may be realized as a frequency modulated continuous wave (FMCW) radar or a frequency shift keying (FSK) radar according to signal waveform. The radar can detect an object through electromagnetic waves on the basis of TOF (Time of Flight) or phase shift and detect the position of the detected object, a distance to the detected object and a relative speed with respect to the detected object. The radar may be disposed at an appropriate position outside the vehicle in order to detect objects positioned in front of, behind or on the side of the vehicle.

2.3 Lidar

The lidar can generate information about an object outside the vehicle 10 using a laser beam. The lidar may include a light transmitter, a light receiver, and at least one processor which is electrically connected to the light transmitter and the light receiver, processes received signals and generates data about an object on the basis of the processed signal. The lidar may be realized according to TOF or phase shift. The lidar may be realized as a driven type or a non-driven type. A driven type lidar may be rotated by a motor and detect an object around the vehicle 10. A non-driven type lidar may detect an object positioned within a predetermined range from the vehicle according to light steering. The vehicle 10 may include a plurality of non-drive type lidars. The lidar can detect an object through a laser beam on the basis of TOF (Time of Flight) or phase shift and detect the position of the detected object, a distance to the detected object and a relative speed with respect to the detected object. The lidar may be disposed at an appropriate position outside the vehicle in order to detect objects positioned in front of, behind or on the side of the vehicle.

3) Communication Device

The communication device 220 can exchange signals with devices disposed outside the vehicle 10. The communication device 220 can exchange signals with at least one of infrastructure (e.g., a server and a broadcast station), another vehicle and a terminal. The communication device 220 may include a transmission antenna, a reception antenna, and at least one of a radio frequency (RF) circuit and an RF element which can implement various communication protocols in order to perform communication.

For example, the communication device can exchange signals with external devices on the basis of C-V2X (Cellular V2X). For example, C-V2X can include sidelink communication based on LTE and/or sidelink communication based on NR. Details related to C-V2X will be described later.

For example, the communication device can exchange signals with external devices on the basis of DSRC (Dedicated Short Range Communications) or WAVE (Wireless Access in Vehicular Environment) standards based on IEEE 802.11p PHY/MAC layer technology and IEEE 1609 Network/Transport layer technology. DSRC (or WAVE standards) is communication specifications for providing an intelligent transport system (ITS) service through short-range dedicated communication between vehicle-mounted devices or between a roadside device and a vehicle-mounted device. DSRC may be a communication scheme that can use a frequency of 5.9 GHz and have a data transfer rate in the range of 3 Mbps to 27 Mbps. IEEE 802.11p may be combined with IEEE 1609 to support DSRC (or WAVE standards).

The communication device of the present invention can exchange signals with external devices using only one of C-V2X and DSRC. Alternatively, the communication device of the present invention can exchange signals with external devices using a hybrid of C-V2X and DSRC.

4) Driving Operation Device

The driving operation device 230 is a device for receiving user input for driving. In a manual mode, the vehicle 10 may be driven on the basis of a signal provided by the driving operation device 230. The driving operation device 230 may include a steering input device (e.g., a steering wheel), an acceleration input device (e.g., an acceleration pedal) and a brake input device (e.g., a brake pedal).

5) Main ECU

The main ECU 240 can control the overall operation of at least one electronic device included in the vehicle 10.

6) Driving Control Device

The driving control device 250 is a device for electrically controlling various vehicle driving devices included in the vehicle 10. The driving control device 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device and a suspension driving control device. Meanwhile, the safety device driving control device may include a seat belt driving control device for seat belt control.

The driving control device 250 includes at least one electronic control device (e.g., a control ECU (Electronic Control Unit)).

The driving control device 250 can control vehicle driving devices on the basis of signals received by the autonomous device 260. For example, the driving control device 250 can control a power train, a steering device and a brake device on the basis of signals received by the autonomous device 260.

7) Autonomous Device

The autonomous device 260 can generate a route for self-driving on the basis of acquired data. The autonomous device 260 can generate a driving plan for traveling along the generated route. The autonomous device 260 can generate a signal for controlling movement of the vehicle according to the driving plan. The autonomous device 260 can provide the signal to the driving control device 250.

The autonomous device 260 can implement at least one ADAS (Advanced Driver Assistance System) function. The ADAS can implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), a PD collision warning system, TSR (Traffic Sign Recognition), TSA (Traffic Sign Assist), NV (Night Vision), DSM (Driver Status Monitoring) and TJA (Traffic Jam Assist).

The autonomous device 260 can perform switching from a self-driving mode to a manual driving mode or switching from the manual driving mode to the self-driving mode. For example, the autonomous device 260 can switch the mode of the vehicle 10 from the self-driving mode to the manual driving mode or from the manual driving mode to the self-driving mode on the basis of a signal received from the user interface device 200.

8) Sensing Unit

The sensing unit 270 can detect a state of the vehicle. The sensing unit 270 may include at least one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include one or more of an acceleration sensor, a gyro sensor and a magnetic sensor.

The sensing unit 270 can generate vehicle state data on the basis of a signal generated from at least one sensor. Vehicle state data may be information generated on the basis of data detected by various sensors included in the vehicle. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an acceleration pedal, data of a pressure applied to a brake panel, etc.

9) Position Data Generation Device

The position data generation device 280 can generate position data of the vehicle 10. The position data generation device 280 may include at least one of a global positioning system (GPS) and a differential global positioning system (DGPS). The position data generation device 280 can generate position data of the vehicle 10 on the basis of a signal generated from at least one of the GPS and the DGPS. According to an embodiment, the position data generation device 280 can correct position data on the basis of at least one of the inertial measurement unit (IMU) sensor of the sensing unit 270 and the camera of the object detection device 210. The position data generation device 280 may also be called a global navigation satellite system (GNSS).

The vehicle 10 may include an internal communication system 50. The plurality of electronic devices included in the vehicle 10 can exchange signals through the internal communication system 50. The signals may include data. The internal communication system 50 can use at least one communication protocol (e.g., CAN, LIN, FlexRay, MOST or Ethernet).

(3) Components of Autonomous Device

FIG. 7 is a control block diagram of the autonomous device according to an embodiment of the present invention.

Referring to FIG. 7, the autonomous device 260 may include a memory 140, a processor 170, an interface 180 and a power supply 190.

The memory 140 is electrically connected to the processor 170. The memory 140 can store basic data with respect to units, control data for operation control of units, and input/output data. The memory 140 can store data processed in the processor 170. Hardware-wise, the memory 140 can be configured as at least one of a ROM, a RAM, an EPROM, a flash drive and a hard drive. The memory 140 can store various types of data for overall operation of the autonomous device 260, such as a program for processing or control of the processor 170. The memory 140 may be integrated with the processor 170. According to an embodiment, the memory 140 may be categorized as a subcomponent of the processor 170.

The interface 180 can exchange signals with at least one electronic device included in the vehicle 10 in a wired or wireless manner. The interface 180 can exchange signals with at least one of the object detection device 210, the communication device 220, the driving operation device 230, the main ECU 240, the driving control device 250, the sensing unit 270 and the position data generation device 280 in a wired or wireless manner. The interface 180 can be configured using at least one of a communication module, a terminal, a pin, a cable, a port, a circuit, an element and a device.

The power supply 190 can provide power to the autonomous device 260. The power supply 190 can be provided with power from a power source (e.g., a battery) included in the vehicle 10 and supply the power to each unit of the autonomous device 260. The power supply 190 can operate according to a control signal supplied from the main ECU 240. The power supply 190 may include a switched-mode power supply (SMPS).

The processor 170 can be electrically connected to the memory 140, the interface 180 and the power supply 190 and exchange signals with these components. The processor 170 can be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 can be operated by power supplied from the power supply 190. The processor 170 can receive data, process the data, generate a signal and provide the signal while power is supplied thereto.

The processor 170 can receive information from other electronic devices included in the vehicle 10 through the interface 180. The processor 170 can provide control signals to other electronic devices in the vehicle 10 through the interface 180.

The autonomous device 260 may include at least one printed circuit board (PCB). The memory 140, the interface 180, the power supply 190 and the processor 170 may be electrically connected to the PCB.

(4) Operation of Autonomous Device

FIG. 8 is a diagram showing a signal flow in an autonomous vehicle according to an embodiment of the present invention.

1) Reception Operation

Referring to FIG. 8, the processor 170 can perform a reception operation. The processor 170 can receive data from at least one of the object detection device 210, the communication device 220, the sensing unit 270 and the position data generation device 280 through the interface 180. The processor 170 can receive object data from the object detection device 210. The processor 170 can receive HD map data from the communication device 220. The processor 170 can receive vehicle state data from the sensing unit 270. The processor 170 can receive position data from the position data generation device 280.

2) Processing/Determination Operation

The processor 170 can perform a processing/determination operation. The processor 170 can perform the processing/determination operation on the basis of traveling situation information. The processor 170 can perform the processing/determination operation on the basis of at least one of object data, HD map data, vehicle state data and position data.

2.1) Driving Plan Data Generation Operation

The processor 170 can generate driving plan data. For example, the processor 170 may generate electronic horizon data. The electronic horizon data can be understood as driving plan data in a range from a position at which the vehicle 10 is located to a horizon. The horizon can be understood as a point a predetermined distance before the position at which the vehicle 10 is located on the basis of a predetermined traveling route. The horizon may refer to a point at which the vehicle can arrive after a predetermined time from the position at which the vehicle 10 is located along a predetermined traveling route.

The electronic horizon data can include horizon map data and horizon path data.

2.1.1) Horizon Map Data

The horizon map data may include at least one of topology data, road data, HD map data and dynamic data. According to an embodiment, the horizon map data may include a plurality of layers. For example, the horizon map data may include a first layer that matches the topology data, a second layer that matches the road data, a third layer that matches the HD map data, and a fourth layer that matches the dynamic data. The horizon map data may further include static object data.

The topology data may be explained as a map created by connecting road centers. The topology data is suitable for approximate display of a location of a vehicle and may have a data form used for navigation for drivers. The topology data may be understood as data about road information other than information on driveways. The topology data may be generated on the basis of data received from an external server through the communication device 220. The topology data may be based on data stored in at least one memory included in the vehicle 10.

The road data may include at least one of road slope data, road curvature data and road speed limit data. The road data may further include no-passing zone data. The road data may be based on data received from an external server through the communication device 220. The road data may be based on data generated in the object detection device 210.

The HD map data may include detailed topology information in units of lanes of roads, connection information of each lane, and feature information for vehicle localization (e.g., traffic signs, lane marking/attribute, road furniture, etc.). The HD map data may be based on data received from an external server through the communication device 220.

The dynamic data may include various types of dynamic information which can be generated on roads. For example, the dynamic data may include construction information, variable speed road information, road condition information, traffic information, moving object information, etc. The dynamic data may be based on data received from an external server through the communication device 220. The dynamic data may be based on data generated in the object detection device 210.

The processor 170 can provide map data in a range from a position at which the vehicle 10 is located to the horizon.

2.1.2) Horizon Path Data

The horizon path data may be explained as a trajectory through which the vehicle 10 can travel in a range from a position at which the vehicle 10 is located to the horizon. The horizon path data may include data indicating a relative probability of selecting a road at a decision point (e.g., a fork, a junction, a crossroad, or the like). The relative probability may be calculated on the basis of a time taken to arrive at a final destination. For example, if a time taken to arrive at a final destination is shorter when a first road is selected at a decision point than that when a second road is selected, a probability of selecting the first road can be calculated to be higher than a probability of selecting the second road.

The horizon path data can include a main path and a sub-path. The main path may be understood as a trajectory obtained by connecting roads having a high relative probability of being selected. The sub-path can be branched from at least one decision point on the main path. The sub-path may be understood as a trajectory obtained by connecting at least one road having a low relative probability of being selected at at least one decision point on the main path.

3) Control Signal Generation Operation

The processor 170 can perform a control signal generation operation. The processor 170 can generate a control signal on the basis of the electronic horizon data. For example, the processor 170 may generate at least one of a power train control signal, a brake device control signal and a steering device control signal on the basis of the electronic horizon data.

The processor 170 can transmit the generated control signal to the driving control device 250 through the interface 180. The driving control device 250 can transmit the control signal to at least one of a power train 251, a brake device 252 and a steering device 254.

Cabin

FIG. 9 is a diagram showing the interior of the vehicle according to an embodiment of the present invention. FIG. 10 is a block diagram referred to in description of a cabin system for a vehicle according to an embodiment of the present invention.

(1) Components of Cabin

Referring to FIGS. 9 and 10, a cabin system 300 for a vehicle (hereinafter, a cabin system) can be defined as a convenience system for a user who uses the vehicle 10. The cabin system 300 can be explained as a high-end system including a display system 350, a cargo system 355, a seat system 360 and a payment system 365. The cabin system 300 may include a main controller 370, a memory 340, an interface 380, a power supply 390, an input device 310, an imaging device 320, a communication device 330, the display system 350, the cargo system 355, the seat system 360 and the payment system 365. The cabin system 300 may further include components in addition to the components described in this specification or may not include some of the components described in this specification according to embodiments.

1) Main Controller

The main controller 370 can be electrically connected to the input device 310, the communication device 330, the display system 350, the cargo system 355, the seat system 360 and the payment system 365 and exchange signals with these components. The main controller 370 can control the input device 310, the communication device 330, the display system 350, the cargo system 355, the seat system 360 and the payment system 365. The main controller 370 may be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The main controller 370 may be configured as at least one sub-controller. The main controller 370 may include a plurality of sub-controllers according to an embodiment. The plurality of sub-controllers may individually control the devices and systems included in the cabin system 300. The devices and systems included in the cabin system 300 may be grouped by function or grouped on the basis of seats on which a user can sit.

The main controller 370 may include at least one processor 371. Although FIG. 6 illustrates the main controller 370 including a single processor 371, the main controller 371 may include a plurality of processors. The processor 371 may be categorized as one of the above-described sub-controllers.

The processor 371 can receive signals, information or data from a user terminal through the communication device 330. The user terminal can transmit signals, information or data to the cabin system 300.

The processor 371 can identify a user on the basis of image data received from at least one of an internal camera and an external camera included in the imaging device. The processor 371 can identify a user by applying an image processing algorithm to the image data. For example, the processor 371 may identify a user by comparing information received from the user terminal with the image data. For example, the information may include at least one of route information, body information, fellow passenger information, baggage information, position information, preferred content information, preferred food information, disability information and use history information of a user.

The main controller 370 may include an artificial intelligence (AI) agent 372. The AI agent 372 can perform machine learning on the basis of data acquired through the input device 310. The AI agent 371 can control at least one of the display system 350, the cargo system 355, the seat system 360 and the payment system 365 on the basis of machine learning results.

2) Essential Components

The memory 340 is electrically connected to the main controller 370. The memory 340 can store basic data about units, control data for operation control of units, and input/output data. The memory 340 can store data processed in the main controller 370. Hardware-wise, the memory 340 may be configured using at least one of a ROM, a RAM, an EPROM, a flash drive and a hard drive. The memory 340 can store various types of data for the overall operation of the cabin system 300, such as a program for processing or control of the main controller 370. The memory 340 may be integrated with the main controller 370.

The interface 380 can exchange signals with at least one electronic device included in the vehicle 10 in a wired or wireless manner. The interface 380 may be configured using at least one of a communication module, a terminal, a pin, a cable, a port, a circuit, an element and a device.

The power supply 390 can provide power to the cabin system 300. The power supply 390 can be provided with power from a power source (e.g., a battery) included in the vehicle 10 and supply the power to each unit of the cabin system 300. The power supply 390 can operate according to a control signal supplied from the main controller 370. For example, the power supply 390 may be implemented as a switched-mode power supply (SMPS).

The cabin system 300 may include at least one printed circuit board (PCB). The main controller 370, the memory 340, the interface 380 and the power supply 390 may be mounted on at least one PCB.

3) Input Device

The input device 310 can receive a user input. The input device 310 can convert the user input into an electrical signal. The electrical signal converted by the input device 310 can be converted into a control signal and provided to at least one of the display system 350, the cargo system 355, the seat system 360 and the payment system 365. The main controller 370 or at least one processor included in the cabin system 300 can generate a control signal based on an electrical signal received from the input device 310.

The input device 310 may include at least one of a touch input unit, a gesture input unit, a mechanical input unit and a voice input unit. The touch input unit can convert a user's touch input into an electrical signal. The touch input unit may include at least one touch sensor for detecting a user's touch input. According to an embodiment, the touch input unit can realize a touch screen by integrating with at least one display included in the display system 350. Such a touch screen can provide both an input interface and an output interface between the cabin system 300 and a user. The gesture input unit can convert a user's gesture input into an electrical signal. The gesture input unit may include at least one of an infrared sensor and an image sensor for detecting a user's gesture input. According to an embodiment, the gesture input unit can detect a user's three-dimensional gesture input. To this end, the gesture input unit may include a plurality of light output units for outputting infrared light or a plurality of image sensors. The gesture input unit may detect a user's three-dimensional gesture input using TOF (Time of Flight), structured light or disparity. The mechanical input unit can convert a user's physical input (e.g., press or rotation) through a mechanical device into an electrical signal. The mechanical input unit may include at least one of a button, a dome switch, a jog wheel and a jog switch. Meanwhile, the gesture input unit and the mechanical input unit may be integrated. For example, the input device 310 may include a jog dial device that includes a gesture sensor and is formed such that it can be inserted/ejected into/from a part of a surrounding structure (e.g., at least one of a seat, an armrest and a door). When the jog dial device is parallel to the surrounding structure, the jog dial device can serve as a gesture input unit. When the jog dial device is protruded from the surrounding structure, the jog dial device can serve as a mechanical input unit. The voice input unit can convert a user's voice input into an electrical signal. The voice input unit may include at least one microphone. The voice input unit may include a beam forming MIC.

4) Imaging Device

The imaging device 320 can include at least one camera. The imaging device 320 may include at least one of an internal camera and an external camera. The internal camera can capture an image of the inside of the cabin. The external camera can capture an image of the outside of the vehicle. The internal camera can acquire an image of the inside of the cabin. The imaging device 320 may include at least one internal camera. It is desirable that the imaging device 320 include as many cameras as the number of passengers who can ride in the vehicle. The imaging device 320 can provide an image acquired by the internal camera. The main controller 370 or at least one processor included in the cabin system 300 can detect a motion of a user on the basis of an image acquired by the internal camera, generate a signal on the basis of the detected motion and provide the signal to at least one of the display system 350, the cargo system 355, the seat system 360 and the payment system 365. The external camera can acquire an image of the outside of the vehicle. The imaging device 320 may include at least one external camera. It is desirable that the imaging device 320 include as many cameras as the number of doors through which passengers ride in the vehicle. The imaging device 320 can provide an image acquired by the external camera. The main controller 370 or at least one processor included in the cabin system 300 can acquire user information on the basis of the image acquired by the external camera. The main controller 370 or at least one processor included in the cabin system 300 can authenticate a user or acquire body information (e.g., height information, weight information, etc.), fellow passenger information and baggage information of a user on the basis of the user information.

5) Communication Device

The communication device 330 can exchange signals with external devices in a wireless manner. The communication device 330 can exchange signals with external devices through a network or directly exchange signals with external devices. External devices may include at least one of a server, a mobile terminal and another vehicle. The communication device 330 may exchange signals with at least one user terminal. The communication device 330 may include an antenna and at least one of an RF circuit and an RF element which can implement at least one communication protocol in order to perform communication. According to an embodiment, the communication device 330 may use a plurality of communication protocols. The communication device 330 may switch communication protocols according to a distance to a mobile terminal.

For example, the communication device can exchange signals with external devices on the basis of C-V2X (Cellular V2X). For example, C-V2X may include sidelink communication based on LTE and/or sidelink communication based on NR. Details related to C-V2X will be described later.

For example, the communication device can exchange signals with external devices on the basis of DSRC (Dedicated Short Range Communications) or WAVE (Wireless Access in Vehicular Environment) standards based on IEEE 802.11p PHY/MAC layer technology and IEEE 1609 Network/Transport layer technology. DSRC (or WAVE standards) is communication specifications for providing an intelligent transport system (ITS) service through short-range dedicated communication between vehicle-mounted devices or between a roadside device and a vehicle-mounted device. DSRC may be a communication scheme that can use a frequency of 5.9 GHz and have a data transfer rate in the range of 3 Mbps to 27 Mbps. IEEE 802.11p may be combined with IEEE 1609 to support DSRC (or WAVE standards).

The communication device of the present invention can exchange signals with external devices using only one of C-V2X and DSRC. Alternatively, the communication device of the present invention can exchange signals with external devices using a hybrid of C-V2X and DSRC.

6) Display System

The display system 350 can display graphic objects. The display system 350 may include at least one display device. For example, the display system 350 may include a first display device 410 for common use and a second display device 420 for individual use.

6.1) Common Display Device

The first display device 410 may include at least one display 411 which outputs visual content. The display 411 included in the first display device 410 may be realized by at least one of a flat panel display, a curved display, a rollable display and a flexible display. For example, the first display device 410 may include a first display 411 which is positioned behind a seat and formed to be inserted/ejected into/from the cabin, and a first mechanism for moving the first display 411. The first display 411 may be disposed such that it can be inserted/ejected into/from a slot formed in a seat main frame. According to an embodiment, the first display device 410 may further include a flexible area control mechanism. The first display may be formed to be flexible and a flexible area of the first display may be controlled according to user position. For example, the first display device 410 may be disposed on the ceiling inside the cabin and include a second display formed to be rollable and a second mechanism for rolling or unrolling the second display. The second display may be formed such that images can be displayed on both sides thereof. For example, the first display device 410 may be disposed on the ceiling inside the cabin and include a third display formed to be flexible and a third mechanism for bending or unbending the third display. According to an embodiment, the display system 350 may further include at least one processor which provides a control signal to at least one of the first display device 410 and the second display device 420. The processor included in the display system 350 can generate a control signal on the basis of a signal received from at last one of the main controller 370, the input device 310, the imaging device 320 and the communication device 330.

A display area of a display included in the first display device 410 may be divided into a first area 411a and a second area 411b. The first area 411a can be defined as a content display area. For example, the first area 411 may display at least one of graphic objects corresponding to can display entertainment content (e.g., movies, sports, shopping, food, etc.), video conferences, food menu and augmented reality screens. The first area 411a may display graphic objects corresponding to traveling situation information of the vehicle 10. The traveling situation information may include at least one of object information outside the vehicle, navigation information and vehicle state information. The object information outside the vehicle may include information on presence or absence of an object, positional information of an object, information on a distance between the vehicle and an object, and information on a relative speed of the vehicle with respect to an object. The navigation information may include at least one of map information, information on a set destination, route information according to setting of the destination, information on various objects on a route, lane information and information on the current position of the vehicle. The vehicle state information may include vehicle attitude information, vehicle speed information, vehicle tilt information, vehicle weight information, vehicle orientation information, vehicle battery information, vehicle fuel information, vehicle tire pressure information, vehicle steering information, vehicle indoor temperature information, vehicle indoor humidity information, pedal position information, vehicle engine temperature information, etc. The second area 411b can be defined as a user interface area. For example, the second area 411b may display an AI agent screen. The second area 411b may be located in an area defined by a seat frame according to an embodiment. In this case, a user can view content displayed in the second area 411b between seats. The first display device 410 may provide hologram content according to an embodiment. For example, the first display device 410 may provide hologram content for each of a plurality of users such that only a user who requests the content can view the content.

6.2) Display Device for Individual Use

The second display device 420 can include at least one display 421. The second display device 420 can provide the display 421 at a position at which only an individual passenger can view display content. For example, the display 421 may be disposed on an armrest of a seat. The second display device 420 can display graphic objects corresponding to personal information of a user. The second display device 420 may include as many displays 421 as the number of passengers who can ride in the vehicle. The second display device 420 can realize a touch screen by forming a layered structure along with a touch sensor or being integrated with the touch sensor. The second display device 420 can display graphic objects for receiving a user input for seat adjustment or indoor temperature adjustment.

7) Cargo System

The cargo system 355 can provide items to a user at the request of the user. The cargo system 355 can operate on the basis of an electrical signal generated by the input device 310 or the communication device 330. The cargo system 355 can include a cargo box. The cargo box can be hidden in a part under a seat. When an electrical signal based on user input is received, the cargo box can be exposed to the cabin. The user can select a necessary item from articles loaded in the cargo box. The cargo system 355 may include a sliding moving mechanism and an item pop-up mechanism in order to expose the cargo box according to user input. The cargo system 355 may include a plurality of cargo boxes in order to provide various types of items. A weight sensor for determining whether each item is provided may be embedded in the cargo box.

8) Seat System

The seat system 360 can provide a user customized seat to a user. The seat system 360 can operate on the basis of an electrical signal generated by the input device 310 or the communication device 330. The seat system 360 can adjust at least one element of a seat on the basis of acquired user body data. The seat system 360 may include a user detection sensor (e.g., a pressure sensor) for determining whether a user sits on a seat. The seat system 360 may include a plurality of seats on which a plurality of users can sit. One of the plurality of seats can be disposed to face at least another seat. At least two users can set facing each other inside the cabin.

9) Payment System

The payment system 365 can provide a payment service to a user. The payment system 365 can operate on the basis of an electrical signal generated by the input device 310 or the communication device 330. The payment system 365 can calculate a price for at least one service used by the user and request the user to pay the calculated price.

(2) Autonomous Vehicle Usage Scenarios

FIG. 11 is a diagram referred to in description of a usage scenario of a user according to an embodiment of the present invention.

1) Destination Prediction Scenario

A first scenario S111 is a scenario for prediction of a destination of a user. An application which can operate in connection with the cabin system 300 can be installed in a user terminal. The user terminal can predict a destination of a user on the basis of user's contextual information through the application. The user terminal can provide information on unoccupied seats in the cabin through the application.

2) Cabin Interior Layout Preparation Scenario

A second scenario S112 is a cabin interior layout preparation scenario. The cabin system 300 may further include a scanning device for acquiring data about a user located outside the vehicle. The scanning device can scan a user to acquire body data and baggage data of the user. The body data and baggage data of the user can be used to set a layout. The body data of the user can be used for user authentication. The scanning device may include at least one image sensor. The image sensor can acquire a user image using light of the visible band or infrared band.

The seat system 360 can set a cabin interior layout on the basis of at least one of the body data and baggage data of the user. For example, the seat system 360 may provide a baggage compartment or a car seat installation space.

3) User Welcome Scenario

A third scenario S113 is a user welcome scenario. The cabin system 300 may further include at least one guide light. The guide light can be disposed on the floor of the cabin. When a user riding in the vehicle is detected, the cabin system 300 can turn on the guide light such that the user sits on a predetermined seat among a plurality of seats. For example, the main controller 370 may realize a moving light by sequentially turning on a plurality of light sources over time from an open door to a predetermined user seat.

4) Seat Adjustment Service Scenario

A fourth scenario S114 is a seat adjustment service scenario. The seat system 360 can adjust at least one element of a seat that matches a user on the basis of acquired body information.

5) Personal Content Provision Scenario

A fifth scenario S115 is a personal content provision scenario. The display system 350 can receive user personal data through the input device 310 or the communication device 330. The display system 350 can provide content corresponding to the user personal data.

6) Item Provision Scenario

A sixth scenario S116 is an item provision scenario. The cargo system 355 can receive user data through the input device 310 or the communication device 330. The user data may include user preference data, user destination data, etc. The cargo system 355 can provide items on the basis of the user data.

7) Payment Scenario

A seventh scenario S117 is a payment scenario. The payment system 365 can receive data for price calculation from at least one of the input device 310, the communication device 330 and the cargo system 355. The payment system 365 can calculate a price for use of the vehicle by the user on the basis of the received data. The payment system 365 can request payment of the calculated price from the user (e.g., a mobile terminal of the user).

8) Display System Control Scenario of User

An eighth scenario S118 is a display system control scenario of a user. The input device 310 can receive a user input having at least one form and convert the user input into an electrical signal. The display system 350 can control displayed content on the basis of the electrical signal.

9) AI Agent Scenario

A ninth scenario S119 is a multi-channel artificial intelligence (AI) agent scenario for a plurality of users. The AI agent 372 can discriminate user inputs from a plurality of users. The AI agent 372 can control at least one of the display system 350, the cargo system 355, the seat system 360 and the payment system 365 on the basis of electrical signals obtained by converting user inputs from a plurality of users.

10) Multimedia Content Provision Scenario for Multiple Users

A tenth scenario S120 is a multimedia content provision scenario for a plurality of users. The display system 350 can provide content that can be viewed by all users together. In this case, the display system 350 can individually provide the same sound to a plurality of users through speakers provided for respective seats. The display system 350 can provide content that can be individually viewed by a plurality of users. In this case, the display system 350 can provide individual sound through a speaker provided for each seat.

11) User Safety Secure Scenario

An eleventh scenario S121 is a user safety secure scenario. When information on an object around the vehicle which threatens a user is acquired, the main controller 370 can control an alarm with respect to the object around the vehicle to be output through the display system 350.

12) Personal Belongings Loss Prevention Scenario

A twelfth scenario S122 is a user's belongings loss prevention scenario. The main controller 370 can acquire data about user's belongings through the input device 310. The main controller 370 can acquire user motion data through the input device 310. The main controller 370 can determine whether the user exits the vehicle leaving the belongings in the vehicle on the basis of the data about the belongings and the motion data. The main controller 370 can control an alarm with respect to the belongings to be output through the display system 350.

13) Alighting Report Scenario

A thirteenth scenario S123 is an alighting report scenario. The main controller 370 can receive alighting data of a user through the input device 310. After the user exits the vehicle, the main controller 370 can provide report data according to alighting to a mobile terminal of the user through the communication device 330. The report data can include data about a total charge for using the vehicle 10.

The above-describe 5G communication technology can be combined with methods proposed in the present invention which will be described later and applied or can complement the methods proposed in the present invention to make technical features of the present invention concrete and clear.

Hereinafter, various embodiments of the present invention will be described in detail with reference to the attached drawings.

The 5G communication technology discussed above may be applied in combination with the methods proposed in the present disclosure to be described later, or may be used as a supplement to embody or clarify the technical features of the methods proposed in the present disclosure The present invention proposes a technology that processes data via P2P between vehicles when a network delay occurs by minimizing vehicles' use of resources and overcoming the performance limitations of vehicles.

Hereinafter, various embodiments of the present invention will be described in details with reference to the accompanying drawings. The terms "first vehicle" and "second vehicle" as used herein cover a vehicle, and are not interpreted as having other meanings or effects unless specifically defined in context. Also, the terms "vehicle" and "a passenger's mobile terminal" cover a "user terminal", and are not interpreted as having other meanings or effects unless specifically defined. The term "passenger" refers to a person using a shared vehicle, and may be used interchangeably with a "user" and does not have a distinct meaning.

FIG. 12 is a block diagram of an autonomous vehicle for managing lost property, that is applicable in the present invention.

Referring to FIG. 12, a shared autonomous vehicle may include a sensor part, an alarming part, a second communication module, a second memory, and a navigation.

The sensor part 1210 may include a camera 1211, a weight sensor 1212, and an infrared sensor 1213. The camera 1211 and the infrared sensor 1213 may sense a passenger's behaviors, such as standing up from the seat or sitting down on it, shoving their hand into a pocket and taking it out, changing seats in the vehicle, shifting around in the seat, and clenching and unclenching their hands. Also, the passenger's hand movements may be detected by including an interior camera for tracking the passenger's hands or setting up a tracking system on the existing camera 1211. The weight sensor 1212 is provided in the seat and also may be provided at, but not limited to, the lower portion or backrest of the seat. The weight sensor 1212 may detect the passenger's movements by detecting a weight change when the passenger sits down on the seat or stands up, or may detect the passenger's movement information by taking account of how much the passenger tilts their seat and how far the passenger leans back in the seat. Also, the weight sensor 1212 may detect a shift in the seat's center of gravity when the passenger shifts around in the seat.

The second communication module 1230 may send and receive data to and from a server 1300. Specifically, they may send and receive the passenger's information, likely lost property spot information, lost property search request information, lost property retrieval request information, and guidance information on how to retrieve lost property.

The navigation 1250 provides transportation information service, map information and guidance service, and route guidance service, and the passenger may be informed of these services through the alarming part 1220. Also, the navigation 1250 may receive the lost property spot information from the server 1300 and use it when setting a route toward a lost property spot.

The alarming part 1220 may include a display 1222 and a speaker 1221. The vehicle may guide the passenger to the likely lost property spot information, lost property search request information, lost property retrieval request information, and guidance information on how to retrieve lost property, which are transmitted from the server 1300 through the alarming part 1220. Also, other information that helps facilitate lost property management may be displayed along with the likely lost property spot information. For example, information on likely times of loss at likely lost property spots and loss behavior information may be displayed along with the likely lost property spot information.

FIG. 13 is a block diagram of a lost property location tracking server applicable to the present invention.

Referring to FIG. 13, the lost property location tracking server 1300 may include a first communication module 1310, a first memory, and a first processor 1320.

The first communication module 1310 may receive sensed information including information on movements that make the passenger prone to losing their property.

The first processor 1320 may include a loss behavior determination module 1321, a likely lost property spot tracking module 1322, a likely lost property route creation module 1323, a lost property retrieval route creation module 1324, and a lost property retrieval vehicle reservation module 1325.

The loss behavior determination module 1321 may classify sensed movement information from the vehicle as a behavior pattern that makes the passenger prone to losing their property. For example, if the passenger stands up or bends over, this may be deemed as a loss behavior. For example, if the passenger changes seats, shifts around in the seat, or reclines the seat back, this may be deemed as a loss behavior. For example, if the passenger shoves their hand into a pocket and takes it out or clenches and unclenches their hands, this may be deemed a loss behavior (FIG. 21 and FIG. 22).

The likely lost property spot tracking module 1322 may determine a corresponding likely lost property spot based on loss behavior information. For example, if the passenger stands up or bends over, the floor under the seat may be deemed as a likely lost property spot. For example, if the passenger changes seats, shifts around in the seat, or reclines the seat back, the inside of the previous seat or new seat or the space between the previous and new seats may be deemed as a likely lost property spot. For example, if the passenger shoves their hand into a pocket and takes it out or clenches and unclenches their hands, the area around the seat or the floor under the seat may be deemed as a likely lost property spot. The likely lost property spot is not limited to the inside of the vehicle, and may include at least one between the vehicle's location at the time of a detected loss behavior and a waypoint on the vehicle's travel route. Furthermore, the passenger's property might go missing in places other than the vehicle. Thus, information about places other than the vehicle, i.e., information about waypoints, may be included, and at least one likely lost property spot including the vehicle's waypoint information may be determined based on the loss behavior information. Accordingly, the likely lost property spot may include the floor under the seat inside the vehicle, the inside of the seat, the space between seats, the vehicle's location on a map at the time of a detected loss behavior, and a waypoint on the vehicle's travel route.

The likely lost property route creation module 1323 may create a likely lost property route including waypoint information related to a first vehicle 1410's waypoint and transit vehicle information for transit to the vehicle 10. The waypoint information may include the location of a waypoint and the time spent at the waypoint. The likely lost property route may include likely lost property spot information, images of loss behaviors at the time of loss, and likely times of loss at likely lost property spots. For example, if the passenger performs a first loss behavior at a first spot while using the first vehicle 1410 with a first vehicle number, stops off at a second spot, and performs a second loss behavior at a third spot while using the vehicle 10 with a vehicle number, a likely lost property route may be created, including the travel route and travel time of the first vehicle 1410, the time spent at the second spot, the travel route and travel time of the vehicle 10, the place the first loss behavior occurred, and the place and time the second loss behavior occurred (see FIG. 23*a*).

The lost property retrieval route creation module 1324 may create a retrieval route with the location of the lost property set as a waypoint or destination, upon a lost property retrieval request. For example, upon detecting loss behavior information at a first spot, a second spot, and a third spot, the likely lost property route creation module 1323 may create a likely lost property route including the first spot, second spot, and third spot and a travel route received from a user terminal. The likely lost property route may include information on at least one likely lost property spot, and the user does not necessarily have to travel a retrieval route including all likely lost property spots to retrieve the lost property. Thus, the retrieval route may be created by taking account of those selected from among the at least one likely lost property spot.

In an embodiment of the present invention, in the case of a first retrieval method for retrieving lost property by finding a new travel route including a likely lost property spot, the server may receive information on a likely lost property spot selected from among at least one likely lost property spot, forward the information on the selected likely lost property spot to the vehicle, and find a new travel route by setting the selected likely lost property spot as a waypoint and setting a prearranged destination as a place of arrival. In this instance, the server may transmit to the vehicle a first message containing information on the new travel route, additional time information, and additional cost information. Afterwards, a third message may be received from the vehicle in response to the first message, and the lost property may be retrieved according to the third message. Furthermore, once the lost property is retrieved from one of the at least one selected likely lost property spot, a new travel route may be found by setting the place the lost property is retrieved as a new place of departure and setting the existing destination as a place of arrival. By finding a new retrieval route, the user is able to retrieve the lost property using an optimal travel route.

In another embodiment of the present invention, in the case of a second retrieval method for retrieving lost property by sending a lost property keeping request to a terminal associated with a likely lost property spot and then reserving a third vehicle, the server may receive information on a likely lost property spot selected from among at least one likely lost property spot, forward the information on the selected likely lost property spot to the vehicle, transmit a lost property keeping request to a terminal associated with the selected likely lost property spot, create guidance information for reserving a third vehicle by setting the place requested to keep the lost property as a waypoint or a place of arrival and setting an expected retrieval time, transmit a second message containing the reservation guidance information to the vehicle, and complete a reservation procedure for retrieval upon receiving a third vehicle reservation request from the user terminal as described in the reservation guidance information. Furthermore, in the second retrieval method, as with the first retrieval method, once the lost property is retrieved from one of the at least one selected lost property spot, a new travel route may be found by setting the lost property retrieval place as a new place of departure and setting the existing destination as a place of arrival. By finding a new retrieval route, the user is able to retrieve the lost property using an optimal travel route.

The lost property retrieval vehicle reservation module 1325 may reserve a retrieval vehicle going to the location of the lost property as a destination, upon a lost property retrieval request. Details of this will be described later below.

The first memory may store the passenger's information, likely lost property spot information, vehicle information, and information on the passenger's travel route. The passenger's information may include the phone number, sex, and age of the passenger using the shared autonomous vehicle. The vehicle information may include the type and registration number of the shared autonomous vehicle. According to an embodiment of the present invention, the first memory may store passenger information based on a lost property-related history including information or messages transmitted and received during each step of the lost property management method of the present invention, so as to deal with other possible lost property later by reading the user's database.

FIG. 14 is a view showing a system between autonomous vehicles, a server, and a mobile terminal according to an exemplary embodiment of the present invention.

Referring to FIG. 14, a network configuration includes autonomous vehicles connected via communication to a centralized server 1300 over a network. Although only three autonomous vehicles are illustrated, a large number of autonomous vehicles may be connected to the server 1300 over a network and managed by the server 1300. The network may be a certain type of network—for example, a wired or wireless short-range communication network, a wide area communication network such as the internet, a cellular network, or a satellite network, or a combination thereof. The server 1300 may be a certain type of server or a server cluster—for example, a web or cloud server, an application server, a backend server, or a combination thereof.

Autonomous vehicles 1410, 1420, and 1430 or a user terminal 1440 may be connected via communication to the centralized server 1300 over a network. While the user terminal 1440 is illustrated as, but not limited to, a cellular phone, it may include every well-known terminal available to the user—for example, a mobile terminal such as a cell-phone.

For example, an autonomous vehicle may sense a passenger's movements by a sensor part, and transmit sensed information to the server 1300 through the first communication module 1310. For example, the server 1300 may transmit and receive messages to and from the autonomous vehicle, including sensed information, likely lost property spot information, a loss occurrence message, a lost property search request, a lost property retrieval request, and information on how to retrieve lost property. For example, the server 1300 may transmit and receive the passenger's travel route information from the user terminal 1440. In one embodiment, the information on how to retrieve lost property may include a new travel route with a likely lost property spot set as a waypoint, additional time, and additional cost. In another embodiment, the information on how to retrieve lost property may include reservation guidance information, including an expected retrieval time and a travel route, which is created by sending a lost property keeping request to a likely lost property spot and setting the place requested to keep the lost property as a place of arrival.

FIG. 15 shows a data processing method according to an exemplary embodiment of the present invention. Referring to FIG. 15, although no communication module is illustrated, the processor may perform communication to implement the operations in the drawings by using a communication module.

The vehicle 10 may sense a passenger's movement information by a sensor part 1210 and transmit sensed information to the server 1300 (S1510).

The server 1300 may receive the information sensed from the passenger, classify a loss behavior based on a preset behavior pattern that makes the passenger prone to losing their property, and create loss behavior information. Afterwards, at least one likely lost property spot including the vehicle's waypoint information may be determined based on the loss behavior information (S1520).

The server 1300 may create likely lost property spot information by taking account of at least one likely lost property spot, and create a likely lost property route including the created likely lost property spot information (S1520). Afterwards, the likely lost property route may be transmitted to the vehicle 10, and the vehicle 10 may receive the likely lost property route and display it through the alarming part 1220 in the vehicle 10.

In another embodiment, the likely lost property spot information may be transmitted to a user terminal, as well as to the vehicle 10, and also may be displayed on the user terminal's display when the passenger gets off the vehicle 10. The transmission of the likely lost property route may prevent property loss (S1530).

The vehicle 10 may receive likely lost property route information, and, in the case of property loss, the vehicle 10 may transmit a lost property search request to the server 1300 (S1540).

The server 1300 may forward the lost property search request to a terminal associated with a likely lost property spot and receive a response about lost property search from the terminal associated with the likely lost property spot. The terminal associated with the likely lost property spot may include at least one between a vehicle used at the time of a detected loss behavior and a waypoint on the vehicle's travel route. For example, if the lost property is not searched for, it can be viewed that the lost property is not in that likely lost property spot. Thus, the passenger can avoid the trouble of going to the location of the lost property when the location is not clear (S1550).

The server 1300 may transmit a response to the lost property search request to the vehicle 10. In another embodiment, the response to the search request may be transmitted to the user terminal. For example, the response to the lost property search request may include a lost property discovery response, a lost property non-existence response, a scheduled search response saying that a search will be conducted after a certain period of time, and a hold message saying that a response will be made after an additional search (S1560).

The vehicle 10 may receive the response to the lost property search request form the server 1300 and transmit a lost property retrieval request. In various embodiments, if a lost property non-existence response is received, the retrieval request may be declined (S1570).

The retrieval method may be determined depending on the type of the retrieval request. Specifically, a retrieval request may contain likely lost property route information including likely lost property spot information. The likely lost property spot information may include at least one among the time a loss behavior occurred at the likely lost property spot, an image of the loss behavior captured by a sensor in the vehicle, the type of the vehicle, and the registration number of the vehicle (S1580). In various embodiments, the type of the retrieval request may include a first retrieval type and a second retrieval type. The first retrieval type is a retrieval request corresponding to a first retrieval method, which involves retrieving lost property by finding a new travel route including a likely lost property spot. The second retrieval type involves retrieving lost property by sending a lost property keeping request and reserving a third vehicle.

Afterwards, information on the retrieval method determined depending on the type of the retrieval request may be transmitted to the vehicle 10 (S1590). The retrieval method may include a first retrieval method and a second retrieval method, and a description of each of these retrieval methods will be omitted since they are redundant.

FIG. 16 is a sequence diagram of a lost property search request according to an exemplary embodiment of the present invention.

Hereinafter, the term "terminal" as used in the drawings and specification may be used interchangeably with a "user terminal" or a "passenger terminal", and all expressions do not convey differences between components, but may be used interchangeably. Also, the term "user terminal" refers to a terminal device that is convenient for use when a user transmits and receives electrical signals.

In the case of a property loss, a user terminal may transmit a property loss occurrence message to the server 1300. The user terminal may include, but not limited to, an autonomous vehicle, a shared autonomous vehicle, and a cellular phone (S1610).

Upon receiving the property loss occurrence message, the server 1300 may ask the user terminal for information on the user's travel at the time of the loss. The travel information may include a waypoint, a texting history on the user terminal, and information on vehicles used on that day (S1620).

The user terminal may transmit a response message containing travel information to the server 1300 (S1630).

The server 1300 may store the received travel information in the first memory, and update loss behavior information, likely lost property spot information, and likely lost property route information (S1640). For example, the serer 1300 may look up vehicles the user rode in based on the information on vehicles used on that day, and load loss behavior information created based on the passenger's behavior information sensed by a sensor part in the vehicles the user rode in and use it in determining likely lost property spots. For example, the server may keep track of the texting history and look up places the user moved to based on where the user sent and received text messages, and include found places in the likely lost property route. For example, the server may create a likely lost property route by receiving stored information on places the user moved to on that day from the user terminal and including these places as a waypoint or likely lost property spot. By including the step of asking the user terminal for information on the user's travel on the day of the loss and receiving the information, the present invention allows for estimating where the user lost their property, apart from a shared vehicle or a waypoint where the user stopped during a ride in the shared vehicle, thereby increasing the possibility of retrieval of lost property.

The first processor 1320 of the server 1300 may load loss behavior information from the first memory, determine a likely lost property spot including vehicle waypoint information based on the loss behavior information, and create likely lost property route information on a map, including at least one likely lost property spot on the day of the loss (S1650).

The server 1300 may transmit the likely route information created by the first processor 1320 to the user terminal, and the user terminal may display the likely location information through a display. It should be noted that the method of guidance is not limited to a display method using a display, but guidance may be given through a speaker (S1660).

The user terminal may transmit a lost property search request to the server 1300 by taking account of the likely lost property spot information, and the server 1300 may transmit a response message about search to the user terminal (S1670).

FIG. 17 is a sequence diagram of a lost property retrieval request according to an exemplary embodiment of the present invention. Specifically, FIG. 17 is a sequence diagram of a first retrieval method.

A terminal may transmit a lost property retrieval request to the server 1300. The lost property retrieval request may contain information on retrieval type and retrieval location. Specifically, the retrieval type may include a second retrieval method in which lost property is retrieved by finding a new travel route including likely lost property spots during a ride in the vehicle 10, sending a lost property keeping request, and reserving the third vehicle 1430 (S1710).

The server 1300 may set at least one likely lost property spot as a waypoint and find a new travel route. Also, additional time and additional cost for the new travel route may be determined (S1720). In various embodiments, if there are a plurality of likely lost property spots, information on a likely lost property spot selected from among the at least one likely lost property spot may be received, information on the selected likely lost property spot may be forwarded to the vehicle 10, and a new travel route may be found by setting the selected likely lost property spot as a waypoint and setting a prearranged destination as a place of arrival. In this case, the user does not have to stop off at all of the likely lost property spots, but may retrieve the lost property by stopping off at some spots designated by the user, which is an advantage in terms of time and cost. Also, if there are two or more likely lost property spots other than the vehicle, the user may try retrieving the lost property by stopping off at all these spots, which may increase the retrieval rate of lost property.

The server 1300 may transmit to a terminal a first message including a new travel route, additional time, and additional cost. For example, the new travel route, additional time, and additional cost may be displayed through the alarming part 1220 in the vehicle. For example, the passenger may be asked a question about whether to reflect these into their travel (S1730)

FIG. 18 is a sequence diagram of a lost property retrieval request according to an exemplary embodiment of the present invention. Specifically, FIG. 18 is a sequence diagram of a second retrieval method.

A first terminal refers to a terminal associated with a likely lost property spot. A second terminal refers to a terminal that transmits a lost property retrieval request and a lost property keeping request to the server. The second terminal may transmit may transmit a lost property retrieval request and a lost property keeping request to the server (S1810).

The server 1300 may create guidance information for reserving the third vehicle 1430 in response to the lost property retrieval request. In another embodiment, guidance information for reserving public transportation, other than the third vehicle 1430, may be created (S1820). In yet another embodiment, in the second retrieval method, as is with the first retrieval method, if there are a plurality of likely lost property spots, information on a likely lost property spot selected from among the at least one likely lost property spot may be received, information on the selected likely lost property spot may be forwarded to the vehicle 10, and a new travel route may be found by setting the selected likely lost property spot as a waypoint and setting a prearranged destination as a place of arrival. In this case, the user does not have to stop off at all of the likely lost property spots, but may retrieve the lost property by stopping off at some spots designated by the user, which is an advantage in terms of time and cost. Also, if there are two or more likely lost property spots other than the vehicle, the user may try retrieving the lost property by stopping off at all these spots, which may increase the retrieval rate of lost property.

The server 1300 may transmit the created reservation guidance information to the second terminal. The passenger may view the reservation guidance information through a display of the second terminal. It should be noted that the method of giving reservation guidance information to the user is not limited to a display method using a display, but guidance may be given through a speaker. The second terminal may include the passenger's user terminal or the vehicle 10 (S1830).

The server 1300 may forward a lost property keeping request message to the first terminal (S1840).

FIGS. 19 to 22 are views showing a sensor capable of detecting a passenger's movement information, that is applicable to the present invention.

Referring to FIGS. 19 to 22, the vehicle may include a camera 1902, an infrared sensor 1903, and a weight sensor 1902. The camera 1902 or infrared sensor 1903 may be provided where the entire upper torso of a passenger sitting in a vehicle seat can be detected, in order to sense the passenger's movements. Alternatively, they may be provided where the entire upper and lower torsos of the passenger can be detected (see FIGS. 19 and 20).

The weight sensor 1212 may be positioned inside a seat. For example, it may be positioned on the bottom or inside of a seat portion supporting the passenger's hips. The weight sensor 1212 may detect the passenger's movements by detecting a weight change when the passenger sits down or stands up. Also, the weight sensor 1212 may detect the passenger's movements by detecting a pressure change when the passenger shifts around in the seat or reclines back by pushing against the backrest (see FIG. 21). Although not shown, the weight sensor 1212 may be positioned under a floor mat of the vehicle under the passenger's feet.

The camera 1211 may track and capture the passenger's hands not the entire upper or lower torso of the passenger. For example, the camera 1211 may detect the outward features of the passenger's hands, including contour, shape, and color, and sense the passenger's movements by tracking the passenger's hands. For example, an interior camera may track and capture the user's hands (see FIG. 22).

It should be noted that the configuration of the present invention is not limited by the locations of the sensors shown in FIGS. 19 and 20 since FIGS. 19 and 20 are just illustrations of the locations of sensors applicable to the present invention.

In various embodiments of the present invention, an electrostatic sensor, a bio-sensor, and a pressure sensor may be included, as well as the camera 1211, infrared sensor 1213, and weight sensor 1212, and the configuration of the present invention is not limited by the types of sensors.

FIG. 23*a* shows an example of a method for displaying a passenger's likely lost property spots and route through a display in a vehicle, that is applicable to the present invention. FIG. 23*b* shows an example of a method for finding a new travel route when retrieving lost property, that is applicable to the present invention. FIG. 23*c* shows an example of a method for finding a new travel route upon completion of retrieval of lost property, that is applicable to the present invention.

Referring to FIG. 23*a*, likely lost property spot information may include a waypoint, the time spent at the waypoint, information on at least one shared vehicle, and a travel route. In various embodiments, travel routes for different shared vehicles may be shown in different colors.

Referring to FIG. 23*b*, if there are a plurality of likely lost property spots Spot1, Spot2, and Spot3, the server may find a new, optimal route for retrieving lost property. For example, in a case where the user loses their property during a ride in the vehicle 10 along a first route 2301, and loss behaviors are detected at the first to third spots Spot1, Spot2, and Spot3, the user does not need to retrieve the lost property along the first route 2301, but may arrive at the destination after conveniently retrieving the lost property along the new route, i.e., a second route 2302.

Referring to FIG. 23*c*, if there are a plurality of likely lost property spots Spot1, Spot2, and Spot3, these likely lost property spots do not necessarily have to be included on the travel route. For example, when retrieving the lost property from the first spot Spot1, the second route 2303 is not the best route to the destination anymore. Accordingly, the server may find a new travel route by setting the first spot Spot1 as a place of departure and maintaining the destination settings. In this instance, the vehicle 10 may travel efficiently to the destination along the new travel route.

FIG. 24 shows a method for processing data from a server's point of view according to an exemplary embodiment of the present invention.

Referring to FIG. 24, the server 1300 may receive sensed information from a vehicle (S2410), and create a passenger's loss behavior information, which is classified as a behavior pattern that makes the passenger prone to losing their property, from the sensed information. In this instance, a likely lost property spot including the vehicle's waypoint information may be determined based on the loss behavior information, and a likely lost property route including likely lost property spot information may be created (S2420).

The server 1300 may transmit the information on the determined likely lost property route to the vehicle 10 (S2430). A lost property search request may be received from the vehicle 10 (S2440) and transmitted to a terminal associated with a likely lost property spot (S2450). If there is a response to the search request, the lost property spot information is transmitted to the vehicle 10 (S2470). If there is no response to the search request or a response, if any, is held, the lost property spot information is not transmitted. The likely lost property spot information may include information on at least one likely lost property spot, and if there is information on a plurality of likely lost property spots, this information may include information on at least one likely lost property spot selected by the user. Also, the likely lost property spot information may be a combination of likely lost property spot information and navigation information.

A lost property retrieval request may be received from the vehicle 10 (S2480), and, upon a retrieval request, guidance on how to retrieve the lost property may be given depending on the type of the retrieval request (S2490). The vehicle 10 may include a first vehicle and a second vehicle which the user rides in at a later time than the first vehicle.

FIG. 25 shows a method for processing data from a vehicle's point of view according to an exemplary embodiment of the present invention.

A passenger's movements may be sensed by a sensor in the vehicle (S2510), and sensed information may be transmitted to the server 1300 to create loss behavior information (S2520). Afterwards, a likely lost property route including likely lost property spot information may be received from the server 1300 (S2530), and likely lost property route information may be displayed through the alarming part 1220 in the vehicle. The likely lost property route information may include at least one likely lost property spot.

If the passenger loses their property, the passenger may transmit a lost property search request to the server 1300 (S2540). The server 1300 may forward the search request message to a terminal associated with a likely lost property spot, and the terminal associated with the likely lost property spot may transmit a response to the search request to the server 1300 (S2550). The terminal associated with the likely lost property spot may include at least one between a vehicle used at the time of a detected loss behavior and a waypoint on the vehicle's travel route.

When the vehicle 10 transmits a lost property retrieval request (S2560), the server 1300 may transmit a response to this request to the vehicle 10. Details of this will be omitted since they are redundant.

FIG. 26 shows a method for processing data about determining a likely lost property spot and forwarding a search request from a system's point of view according to an exemplary embodiment of the present invention.

If a passenger loses their property, the passenger may transmit a loss occurrence message to the server 1300 by using the vehicle 10 or a user terminal. In this instance, the server 1300 may receive the passenger's travel information from the vehicle 10 or the user terminal (S2620).

Afterwards, the server 1300 may store the travel information in a first memory (S2630), and determine a likely lost property spot by taking account of the passenger information stored in the first memory (S2640).

Afterwards, the server 1300 may transmit likely lost property spot information to the vehicle (S2650). In this instance, upon receiving a lost property search request from the vehicle 10, the server 1300 may forward the search request to each likely lost property spot including the location of the vehicle 10 and the locations of waypoints (S2670).

FIGS. 27a to 27c show a method for processing data about a lost property retrieval request and how to retrieve lost property from a system's point of view according to an exemplary embodiment of the present invention. A first terminal refers to a terminal associated with a likely lost property spot. A second terminal refers to a user terminal that transmits a lost property retrieval request and a lost property keeping request to the server.

Referring to FIGS. 27a to 27c, if there is a response from at least one likely place where the lost property would be, in response to a search request, the passenger may select at least one likely lost property spot and transmit it to the server 1300 through the vehicle 10 or user terminal (S2710).

Afterwards, the server 1300 may find the best travel route to the at least one likely lost property spot selected by the passenger and transmit it to the vehicle 10 or user terminal (S2720).

Afterwards, the method of retrieving the lost property is determined depending on the type of a lost property retrieval request. If there is a retrieval request corresponding to a first retrieval method S2740, the first retrieval method S2740 is selected, and if there is a retrieval request corresponding to a second retrieval method S2750, the second retrieval method S2750 is selected. After giving guidance on how to retrieve the lost property to the vehicle 10 or user terminal according to the first retrieval method S2740 or second retrieval method S2750, the server 1300 may receive a response from the vehicle 10 or user terminal, analyze the passenger's information based on the passenger's lost property-related history (S2760), and store the passenger's information in the first memory (S2770).

In the first retrieval method, the user terminal may transmit a lost property retrieval request to the server 1300. The lost property retrieval request may include information on retrieval type and retrieval location. The server 1300 may set the likely lost property spot as a waypoint and find a new travel route (S2741). Also, additional time and additional cost for the new travel route may be determined (S2742).

In the second retrieval method, the second terminal may transmit a lost property retrieval request and a lost property keeping request to the server 1300 (S2751). The server 1300 may create guidance information for reserving the third vehicle 1430 in response to the lost property retrieval request. In another embodiment, guidance information for reserving public transportation, other than the third vehicle 1430, may be created. The server 1300 may transmit the created reservation guidance information to the second terminal (S2753 and S2754). The passenger may view the reservation guidance information through the alarming part 1220 of the second terminal. The server 1300 may forward the lost property keeping request message to the first terminal (S2751). The first terminal may include at least one between a vehicle used at the time of a detected loss behavior and a waypoint on the vehicle's travel route.

The server 1300 may transmit a first message to a terminal a first message including a new travel route, additional time, and additional cost. For example, the new travel route, additional time, and additional cost may be displayed through the alarming part 1220 in the vehicle. For example, the passenger may be asked a question about whether to reflect these into their travel The present disclosure described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

While the present invention has been described with respect to an example applied to an automated vehicle & highway systems based on a 5G (5 generation) system, it is also applicable to other various wireless communication systems and autonomous vehicles.

The invention claimed is:

1. A method for managing lost property in a vehicle, the method comprising:
   receiving, by a server, a passenger's information sensed by a sensor in the vehicle;
   creating loss behavior information from the sensed information, the loss behavior information being classified as a behavior pattern that makes the passenger prone to losing their property;
   determining at least one likely lost property spot including the vehicle's waypoint information, based on the loss behavior information;
   creating likely lost property spot information by taking account of the at least one likely lost property spot;
   creating a likely lost property route including the likely lost property spot information;
   transmitting the created likely lost property route to the vehicle; and
   receiving a lost property search request from the vehicle and transmitting the same to a terminal associated with the at least one likely lost property spot; and
   receiving a lost property retrieval request from the vehicle and giving guidance on how to retrieve the lost property depending on the type of the retrieval request.

2. The method of claim 1, wherein the vehicle comprises a first vehicle and a second vehicle the passenger rides in at a later time than the first vehicle.

3. The method of claim 1, wherein the sensor comprises at least one among a first sensor for detecting the passenger's gestures, a second sensor for detecting a seat angle in the vehicle, a third sensor for detecting a shift in the seat's center of gravity, and a fourth sensor for detecting a change in the position of the seat.

4. The method of claim 1, wherein the at least one likely lost property spot comprises at least one between the vehicle's location at the time of a detected loss behavior and a waypoint on the vehicle's travel route.

5. The method of claim 1, wherein the likely lost property spot information comprises at least one among the time a loss behavior occurred at the at least one likely lost property spot, an image of the loss behavior captured by the sensor in the vehicle, a type of the vehicle, and a registration number of the vehicle.

6. The method of claim 1, further comprising transmitting the likely lost property spot information to at least one between the vehicle and a mobile terminal, in order to display the likely lost property spot information on the vehicle or the mobile terminal when the passenger gets off the vehicle.

7. The method of claim 1, wherein the retrieval request comprises at least one among the passenger's information, information about the lost property, the likely, lost property spot information, and a time of day the vehicle was used.

8. The method of claim 1, wherein the determining of at least one likely lost property spot comprises:
receiving a loss occurrence message from the vehicle or a mobile terminal;
transmitting to the vehicle or the mobile terminal a message requesting a travel route taken at a time of a loss and receiving a message as a response to the travel route request message; and
determining a likely lost property spot by taking account of information on the travel route taken at the time of the loss, along with the loss behavior information.

9. The method of claim 1, wherein the receiving of the lost property search request and the transmitting of the same to the vehicle further comprise transmitting the lost property search request to the vehicle and at the same time to a waypoint located on the vehicle's travel route.

10. The method of claim 1, wherein the method of retrieving the lost property comprises:
first retrieval method for retrieving the lost property by finding a new travel route including the at least one likely lost property spot; and
a second retrieval method for retrieving the lost property by sending a lost property keeping request and then reserving a third vehicle.

11. The method of claim 10, wherein the first retrieval method comprises:
receiving information on a likely lost property spot selected from among the at least one likely lost property spot;
forwarding the information on the selected likely lost property spot to the vehicle;
finding a new travel route by setting the selected likely lost property spot as a waypoint and setting a prearranged destination as a place of arrival; and
transmitting to the vehicle a first message containing information on the new travel route, additional time information, and additional cost information.

12. The method of claim 11, further comprising:
receiving a third message from the vehicle in response to the first message;
analyzing the passenger's information based on the passenger's lost property-related history; and
storing the analyzed information on the passenger.

13. The method of claim 11, further comprising, once the lost property is retrieved from the selected likely lost property spot, finding a new travel route by setting a place the lost property is retrieved as a new place of departure and setting an existing destination as a place of arrival.

14. The method of claim 10, wherein the second retrieval method comprises:
receiving information on a likely lost property spot selected from among the at least one likely lost property spot;
forwarding the information on the selected likely lost property spot to the vehicle;
transmitting a lost property keeping request to a terminal associated with the selected likely lost property spot;
creating guidance information for reserving a third vehicle by setting a place requested to keep the lost property as a waypoint or a place of arrival and setting an expected retrieval time;
transmitting a second message containing the reservation guidance information to the vehicle.

15. The method of claim 14, further comprising:
receiving a fourth message from the vehicle in response to the second message;
analyzing the passenger's information based on the passenger's lost property-related history; and
storing the analyzed information on the passenger.

16. The method of claim 14, further comprising: once the lost property is retrieved from the selected likely lost property spot, finding a new travel route by setting a place the lost property is retrieved as a new place of departure and setting an existing destination as a place of arrival.

17. A method for managing lost property in a vehicle, the method comprising:
sensing a passenger's movements by a sensor in the vehicle;
transmitting movement information of the passenger sensed by the sensor to a server;
receiving a likely lost property route including likely lost property spot information from the server and transmitting a lost property search request to the server based on the likely lost property route;
receiving a response to the lost property search request from the server and transmitting a lost property retrieval request to the server;
receiving information on how to retrieve the lost property depending on the type of the retrieval request; and
displaying the information on how to retrieve the lost property through an alarming part.

18. The method of claim 17, wherein the vehicle comprises a first vehicle and a second vehicle the passenger rides in at a later time than the first vehicle.

19. The method of claim 17, further comprising displaying the likely lost property route on a display of the vehicle or a mobile terminal through the alarming part in the vehicle when the passenger gets off the vehicle.

20. A lost property management server for managing lost property, in a vehicle, comprising:
a first communication module;
a first memory; and
a first processor,
wherein the first memory stores information sensed by a sensor in the vehicle or travel route information transmitted from a passenger's terminal, and
the first processor creates loss behavior information from the sensed information, the loss behavior information being classified as a behavior pattern that makes the passenger prone to losing their property, determines at least one likely lost property spot based on the loss behavior information, determines at least one lost property spot including the vehicle's waypoint, creates likely lost property spot information by taking account of the at least one likely lost property spot, and determines how to retrieve the lost property upon receiving a lost property retrieval request from the vehicle.

* * * * *